US011891847B2

(12) United States Patent
Racicot et al.

(10) Patent No.: US 11,891,847 B2
(45) Date of Patent: Feb. 6, 2024

(54) COMPACT SLIDING DOOR SYSTEM WITH SOFT-CLOSE AND LOCKING FUNCTIONALITY

(71) Applicant: DIRTT ENVIRONMENTAL SOLUTIONS LTD., Calgary (CA)

(72) Inventors: Danielle L. Racicot, Calgary (CA); Colin V. Blehm, Calgary (CA); Thomas A. Brown, Calgary (CA); Adam J. Stosky, Calgary (CA)

(73) Assignee: DIRTT ENVIRONMENTAL SOLUTIONS LTD., Calgary (CA)

( * ) Notice: Subject to any disclaimer, the term of this patent is extended or adjusted under 35 U.S.C. 154(b) by 87 days.

(21) Appl. No.: 17/244,717

(22) Filed: Apr. 29, 2021

(65) Prior Publication Data

US 2021/0340798 A1 Nov. 4, 2021

Related U.S. Application Data

(60) Provisional application No. 63/018,090, filed on Apr. 30, 2020.

(51) Int. Cl.

*E05D 15/00* (2006.01)
*E05D 15/06* (2006.01)
*E05F 5/00* (2017.01)

(52) U.S. Cl.

CPC .......... *E05D 15/0634* (2013.01); *E05F 5/003* (2013.01); *E05Y 2201/614* (2013.01); *E05Y 2201/684* (2013.01); *E05Y 2900/132* (2013.01)

(58) Field of Classification Search

CPC ..... E05F 5/00; E05F 5/003; E05F 5/02; E05F 5/05; E05F 1/08; E05F 1/1091; E05F 1/16; E05F 3/00; E05F 3/02; E05F 3/04; E05F 3/18; E05F 3/227; E05F 3/22; E05F 3/224; E05F 3/10; E05F 3/108; E05Y 2800/24;

(Continued)

(56) References Cited

U.S. PATENT DOCUMENTS

| | | | | |
|---|---|---|---|---|
| 5,450,693 A * | 9/1995 | Tarrega | E05D 13/04 | 49/411 |
| 7,891,052 B2 * | 2/2011 | Haab | E05D 15/0656 | 16/98 |

(Continued)

FOREIGN PATENT DOCUMENTS

| | | | |
|---|---|---|---|
| DE | 202017100244 U1 * | 3/2017 | A47K 3/34 |
| DE | 102020100657 A1 * | 7/2021 | E05D 15/0634 |

(Continued)

*Primary Examiner* — Chuck Y Mah
(74) *Attorney, Agent, or Firm* — Workman Nydegger

(57) ABSTRACT

A sliding door includes a door panel that has a first face, a second face that is opposite to the first face, and a top edge that defines first and second raised portions of the door panel and an open space that extends between the first and second raised portions. The sliding door includes a plurality of rollers affixed to the door panel by first and second mounting assemblies. Each of the plurality of rollers has an axis of rotation that is normal to the first face of the door panel. The sliding door includes a soft-close assembly secured to the first and second mounting assemblies at opposing ends thereof, such that the soft-close assembly is positioned within the open space between the first raised portion of the door panel and the second raised portion of the door panel.

20 Claims, 20 Drawing Sheets

(58) Field of Classification Search

CPC ............. E05Y 2800/21; E05Y 2201/64; E05Y 2201/644; E05Y 2201/264; E05Y 2201/41; E05Y 2201/412; E05Y 2201/47; E05Y 2201/478; E05Y 2201/21; E05Y 2201/488; E05Y 2900/132; E05Y 2900/142; E05Y 2900/14; E05Y 2201/232; E05Y 2201/426; E05Y 2201/638; E05Y 2201/688; E05Y 2800/11; E05Y 2600/13; E05Y 2600/31; E05Y 2600/46; E05Y 2900/148; Y10T 16/27; Y10T 16/56; Y10T 16/61; Y10T 16/593; Y10T 16/276; Y10T 16/281; Y10T 16/379; E05D 15/00; E05D 15/06; E05D 15/12; A47B 88/047; A47B 88/12; A47B 88/14; A47B 2210/0091

See application file for complete search history.

(56) References Cited

U.S. PATENT DOCUMENTS

| | | | | |
|---|---|---|---|---|
| 8,117,784 | B2 * | 2/2012 | Tarrega Illoret | E05D 15/063 16/97 |
| 8,561,352 | B2 * | 10/2013 | Vogler | E05F 5/003 49/138 |
| 9,009,918 | B2 * | 4/2015 | Haab | E05D 15/0652 16/72 |
| 2002/0069588 | A1 * | 6/2002 | Finke | E05F 15/632 49/409 |
| 2008/0115894 | A1 * | 5/2008 | Cech | E06B 9/36 160/168.1 V |
| 2010/0031577 | A1 * | 2/2010 | Haab | E05F 5/003 49/449 |
| 2010/0043172 | A1 * | 2/2010 | Nezu | E05D 13/04 16/82 |
| 2010/0139038 | A1 * | 6/2010 | Busch | E05D 15/063 49/427 |
| 2014/0143980 | A1 * | 5/2014 | Chang | E05D 15/0634 16/91 |
| 2014/0173990 | A1 * | 6/2014 | Schachter | E05D 5/0246 49/404 |
| 2016/0369548 | A1 * | 12/2016 | Dodge | E05F 3/224 |
| 2018/0223579 | A1 * | 8/2018 | Walz | E05F 5/027 |
| 2018/0283074 | A1 * | 10/2018 | Wang | E05F 5/003 |
| 2020/0208451 | A1 * | 7/2020 | Tarrega Klein | E05D 15/0634 |

FOREIGN PATENT DOCUMENTS

| | | | | | |
|---|---|---|---|---|---|
| JP | 2010024744 | A * | 2/2010 | | E05F 1/16 |
| WO | WO-2012098954 | A1 * | 7/2012 | | E05F 1/16 |

* cited by examiner

COMPACT SLIDING DOOR SYSTEM WITH SOFT-CLOSE AND LOCKING FUNCTIONALITY

BACKGROUND

Many buildings include sliding doors for both interior and exterior use. Users (e.g., manufacturers, designers, assemblers, building owners/occupiers, etc.) often desire sliding doors in order to avoid a door swing associated with conventional doors, and/or for aesthetic purposes. Many sliding doors employ one or more rollers attached to a door panel and disposed on a track to enable the sliding door to slide between an open position and a closed position.

The need to affix sliding door rollers to the door panel of a sliding door presents many challenges, particularly for door panels composed of substrate panels such as glass (and/or other transparent/translucent materials). Conventional glass sliding door panels often include structural frame members/supports that enable the door panel to affix to rollers. However, such structural frame members/supports often disrupt the aesthetic of the glass door panel.

Without a structural frame, other glass sliding door panels often utilize roller brackets to affix the rollers to the sliding door panel, allowing the rollers to sit vertically offset from the door panel. However, roller brackets are often large and extend onto the visible portion of the glass sliding door panel, affecting the aesthetic of the door panel.

Additionally, some sliding doors include a soft-close assembly enabling the sliding door to close or open in a controlled, gentle manner. Many users consider soft-close systems necessary on sliding doors that include glass or similar materials in order to prevent the door from breaking or cracking. Soft-close systems, however, conventionally include exposed hardware that can disrupt the aesthetic of the sliding door. For instance, conventional soft-close systems include components that are positioned outside of and/or extend below the sliding door track.

Furthermore, sliding doors can include locking systems to allow the sliding door to be selectively locked or unlocked. The locking systems of conventional sliding doors often include a mortise and a tenon that inserts into the mortise to lock the sliding door. The mortise is typically implemented onto a vertical door frame or wall of the building, while the tenon is arranged on or near the vertical edge of the door panel that abuts the vertical wall or frame of the building when the sliding door is in a closed position. Such conventional arrangement of the mortise and tenon can disrupt the aesthetics of the transition between the door panel and the vertical edge of the door panel and the wall or frame of the building, particularly for sliding door panels that include transparent/translucent materials.

Other existing locking systems for sliding doors are separate from the handle of the sliding door and separate from the interface between the door panel and the frame or wall of the building. Although this approach may slightly improve or preserve the aesthetic of the sliding door, this approach results in a disjointed locking/unlocking process.

Accordingly, there are a number of difficulties associated with sliding doors that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments of the present invention extend to systems apparatuses, and components for forming, assembling, and installing sliding door systems. More specifically, the present invention relates to compact sliding door systems with soft-close and locking functionality.

For example, a sliding door includes a door panel having a first face, a second face opposite the first face, and a top edge defining a first raised portion, a second raised portion, and an open space extending between the first raised portion and the second raised portion. The sliding door can also include a plurality of rollers affixed to the door panel, each of the plurality of rollers having an axis of rotation normal to the first face of the door panel. Further, the sliding door can include a soft-close assembly secured within the open space between the first raised portion of the door panel and the second raised portion of the door panel.

A sliding door system, for example, can include a sliding door having a door panel with a first, face, a second face opposite the first face, and a top edge defining a first raised portion and a second raised portion of the door panel and an open space extending between the first raised portion of the second raised portion. The sliding door can also include a soft-close assembly secured within the open space, and plurality of rollers affixed to the door panel, each roller having an axis of rotation normal to the first face of the door panel. The soft-close assembly can include at least one catch, and a track enclosure having a roller track positioned therein, the plurality of rollers of the sliding door being movably disposed upon the roller track and the soft-close actuator being disposed within the track enclosure. The track enclosure can also include at least one soft-close actuator positioned within the track enclosure, a first soft-close actuator of the at least one soft-close actuator being configured to engage with a first catch of the soft-close assembly to provide soft-close functionality in a first direction. Also, soft-close functionality in a second direction can be provided by a second soft-close actuator of the track enclosure being configured to engage with a second catch of the soft-close assembly.

A track enclosure can include, for example, an enclosure bracket having a top wall, a first vertical wall configured to be disposed over at least a portion of the first face of the door panel when the plurality of rollers of the sliding door are arranged on the roller track within the track enclosure, and a first bottom wall that extends from the first vertical wall toward the first face of the door panel when the plurality of rollers of the sliding door are arranged on the roller track within the track enclosure. The track enclosure can also include a covering plate removably securable to the enclosure bracket, the covering plate having a second vertical wall configured to be disposed over at least a portion of the second face of the door panel when the plurality of rollers of the sliding door are arranged on the roller track within the track enclosure, and a second bottom wall extending from the second vertical wall toward the second face of the door panel when the plurality of rollers of the sliding door are arranged on the roller track within the track enclosure.

A mounting assembly for a sliding door includes a leveling bracket securable to a door panel and a connection plate securable to the leveling bracket. The connection plate includes one or more rollers configured to slidably support the sliding door, and a first horizontal flange protruding horizontally from the connection plate. The leveling bracket includes a first vertical plate, a second vertical plate disposed in a position parallel to the first vertical plate and separated by a distance corresponding to a width of the door panel, at least one door panel support rod spanning the first and second vertical plates, a second horizontal flange extending from the second vertical plate towards the first vertical plate, a leveling bolt adjustably secured to the second horizontal flange and the first horizontal flange of the connection plate, such that a vertical position of the connection plate is adjustable relative to the leveling bracket, and a securement bolt configured to selectively secure the first vertical plate to the connection plate, such that the vertical position of the connection plate relative to the leveling bracket is fixed when the securement bolt is in a locked position.

The embodiments disclosed and claimed herein provide sliding door systems that enable soft-close and/or locking functionality in an advantageous manner. For instance, the sliding door systems of the present disclosure can conceal soft-close systems and rollers within a compact track enclosure. In another example, the locking features of the sliding door systems can be separated from the interface between the door panel and the building frame or wall while still providing a simplified locking/unlocking process.

A locking sliding door system also includes a track enclosure that has a roller track disposed within the track enclosure and a locking pin receiver configured for receiving a locking pin of a locking handle assembly. The locking sliding door system can also include the locking handle assembly. The locking handle assembly can be affixed to the door panel. The locking handle assembly can include a horizontal enclosure that has a rotatable shaft disposed therein, the rotatable shaft operable to cause the locking pin to be inserted into or retracted from the locking pin receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments of the present invention extend to systems, apparatuses, and components for forming, assembling, and installing sliding door systems. More specifically, the present invention relates to compact sliding door systems with soft-close and locking functionality.

For example, at least one embodiment comprises a sliding door that includes a soft-close assembly that is secured within an open space between raised portions of a top edge of a door panel. In at least another embodiment, a sliding door system includes a sliding door and a track enclosure that includes actuators disposed therein configured for engaging with a catch of a soft-close assembly of the sliding door. In at least another embodiment, a locking sliding door system includes a sliding door, a track enclosure, and a locking handle assembly implemented into a vertical door handle.

The sliding door can also include a plurality of rollers affixed to the door panel. Each of the plurality of rollers has an axis of rotation that is normal to the first face of the door panel. The sliding door can also include a soft-close assembly secured within the open space between the first raised portion of the door panel and the second raised portion of the door panel.

Embodiments can include a locking handle assembly having a locking pin, which is configured to be coupled to a vertical shaft, such that the locking pin advances and retracts with the vertical shaft. The locking pin can be configured to reside within a locking pin receiver of a track enclosure when a rotatable shaft of the locking handle assembly is rotated into a locked position, and the locking pin is configured to retract from the locking pin receiver of the track enclosure when the rotatable shaft is rotated into an unlocked position.

The embodiments of sliding door systems, apparatuses, and components described herein may solve a number of problems in the art, such as those noted above. For instance, those skilled in the art will recognize, in view of the present disclosure, that the sliding door systems of the present disclosure can include a soft-close assembly that is affixed to a door panel of a sliding door, rather than the nonmoving structural portions of a sliding door system (e.g., a track or frame). Accordingly, users can advantageously install a soft-close assembly directly on a sliding door panel before installation of the sliding door panel on a sliding door track (rather than a cumbersome installation onto or into a highly situated sliding door track).

In some instances, the embodiments of the present disclosure preserve a desirable aesthetic of the sliding door panel and the adjacent wall or frame by housing the rollers and soft-close system within a track enclosure. The track enclosure is desirably compact in size while retaining the rollers and the soft-close system because the soft-close system can reside within a space formed in the door panel.

Figure 1:
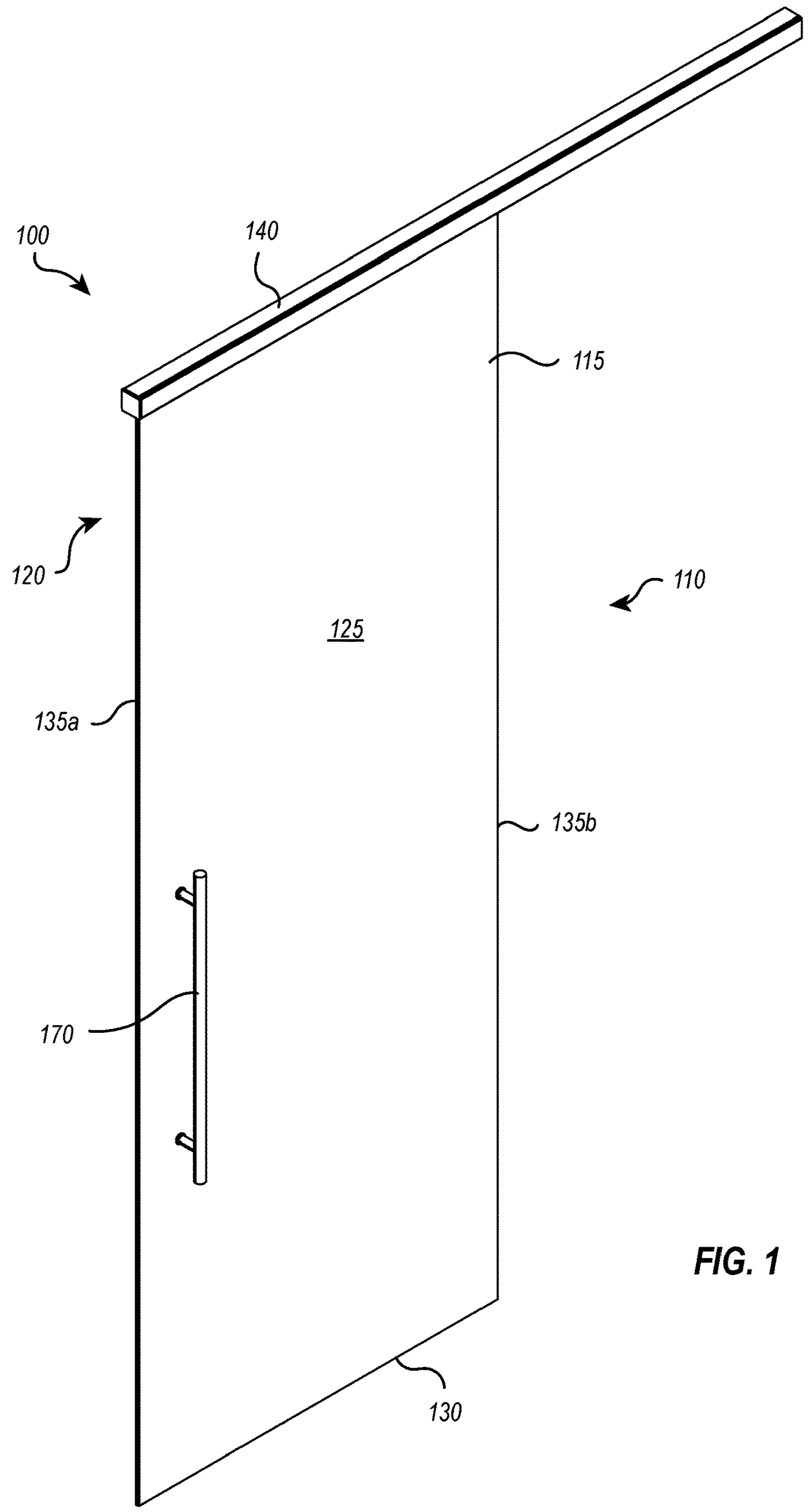
FIG. 1 illustrates a perspective view of a sliding door system according to embodiments of the present disclosure.

FIG. 1 illustrates a perspective view of a sliding door system 100 having a sliding door 110, a track enclosure 140, and a handle assembly 170. The sliding door 110 of FIG. 1 includes a door panel 115 that has a first face 120 (see FIG. 4) and a second face 125 that are opposite to one another. In other words, first face 120 and second face 125 have normal vectors that face opposite directions. Door panel 115 also includes a bottom edge 130, a top edge that is opposite to bottom edge 130 (see top edge 230, FIGS. 2 and 3), and opposing vertical edges 135*a*, 135*b* that extend between bottom edge 130 and the top edge 230.

In some embodiments, door panel 115 is a glass substrate panel. However, those skilled in the art will recognize, in view of the present disclosure, that door panel 115 of sliding door 110 can include other material(s), such as, for example, wood materials, metals, polymers (e.g., plexiglass), fibrous materials, and/or combinations thereof, whether transparent/translucent or opaque, and variations therein.

Figure 2:
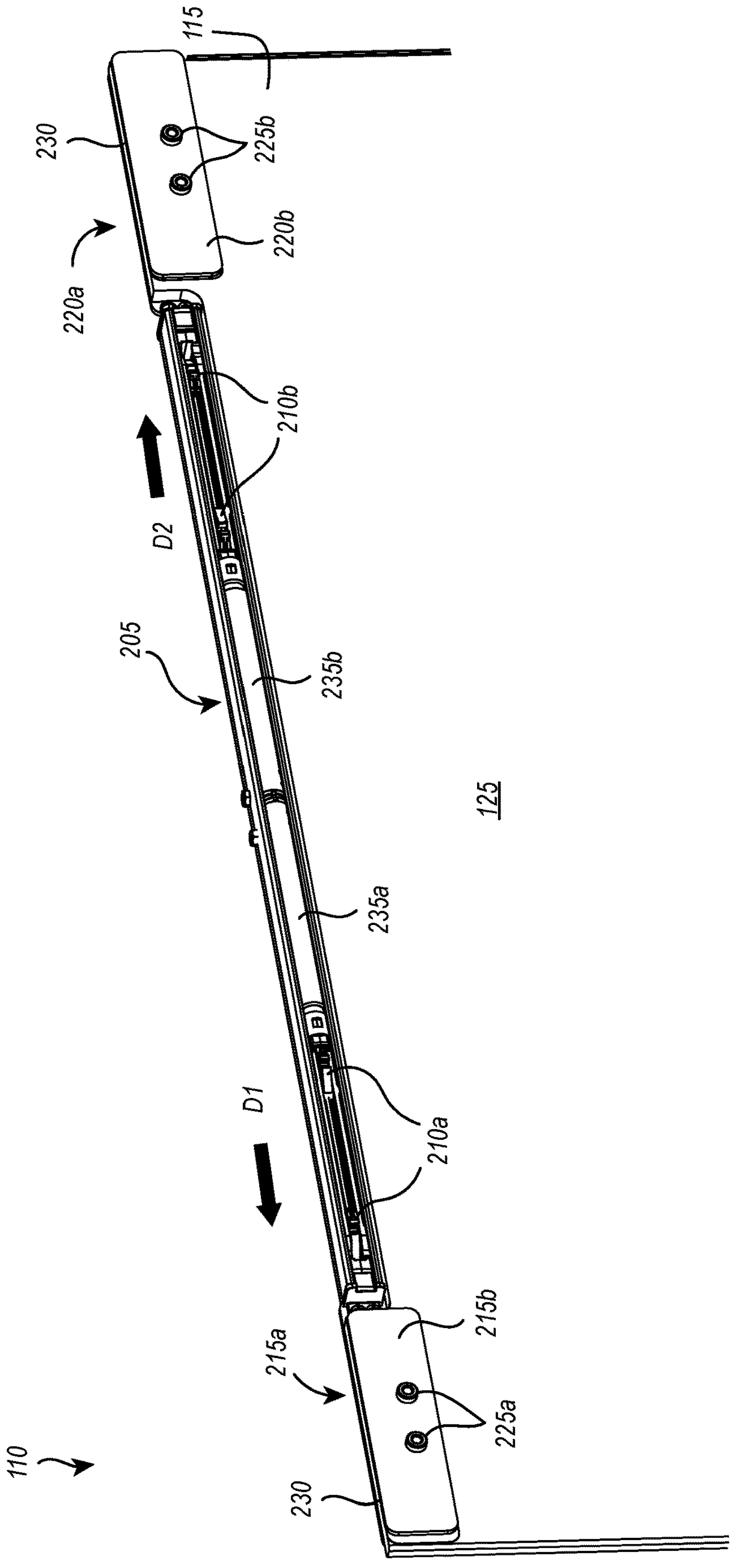
FIG. 2 illustrates a perspective view of a top portion of a sliding door according to embodiments of the present disclosure.

FIG. 2 illustrates a perspective view of a top portion of a sliding door 110 according to one or more embodiments of the present disclosure. As shown, sliding door 110 includes a soft-close assembly 205, which includes one or more catches 210 associated with one or more soft-close dampers 235. For instance, FIG. 2 shows that soft-close assembly 205 includes a first catch 210*a*, a second catch 210*b*, a first soft-close damper 235*a*, and a second soft-close damper 235*b*.

Those skilled in the art will appreciate that, in view of the present disclosure, soft-close dampers 235*a*, 235*b* can include any damping mechanism available that is sized and shaped to fit within track enclosure 140. For example, first and second soft-close dampers 235*a*, 235*b* are shown having a traditional longitudinal piston design, wherein motion of a rod within a piston-shaped chamber is dampened by oil, an exposed portion of the rod being secured to respective first or second catch 210*a*, 210*b* to provide for dampening of sliding door 110.

The first and second catches 210*a*, 210*b* of soft-close assembly 205 are configured to catch first and second actuators 1110*a*, 1110*b* within the track enclosure 140 to provide soft-close functionality in two opposing directions (see FIGS. 11 and 12), the force of contact between respective actuators 1110*a*, 1110*b* and catches 210*a*, 210*b* being dampened by soft-close dampers 235*a*, 235*b* to soften the resultant stopping of sliding door 110. In this regard, in some embodiments, soft-close assembly 205 and actuators 1110*a*, 1110*b* enable sliding door system 100 to provide soft-close functionality whether sliding door 110 is sliding in a first direction D1 to close sliding door 110 or sliding in an opposite second direction D2 to open sliding door 110.

Figure 4:
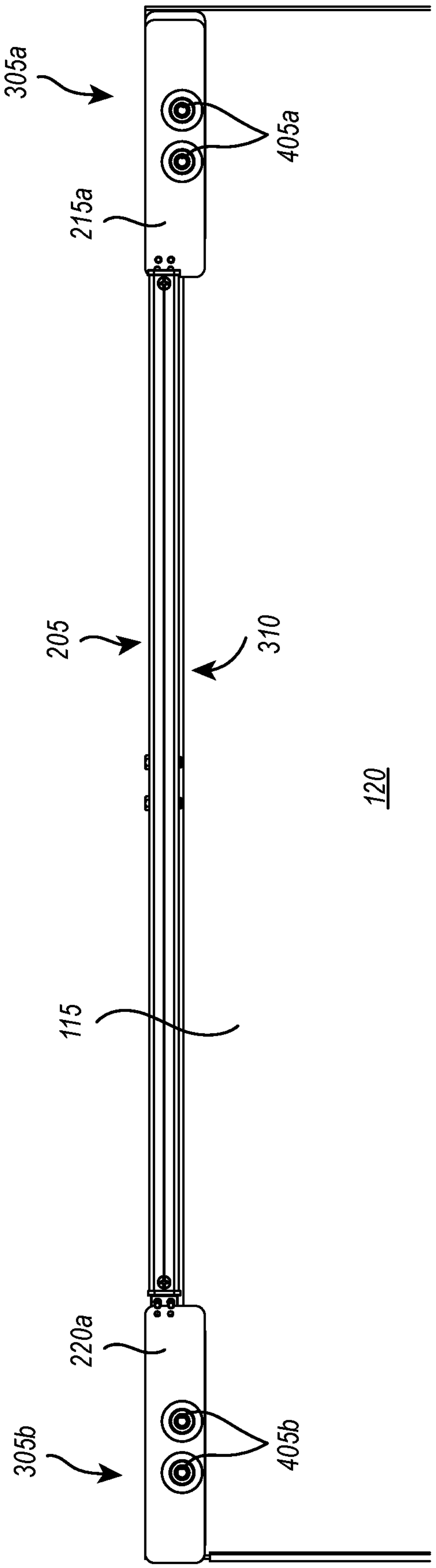
FIG. 4 illustrates a first side view of a top portion of the sliding door of FIG. 2.
Figure 5:
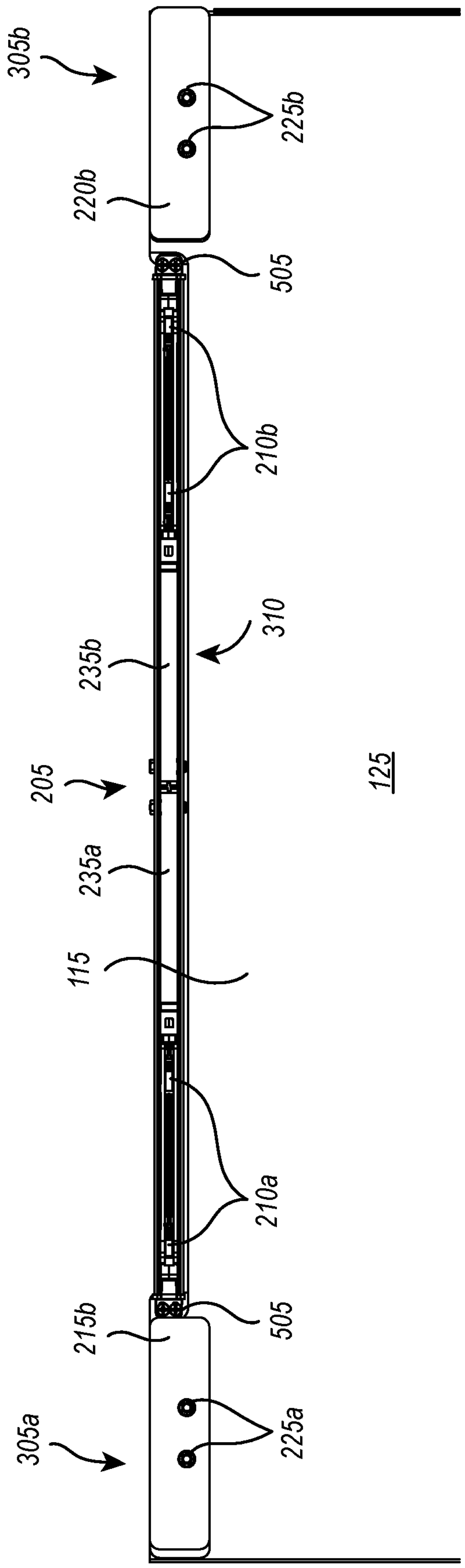
FIG. 5 illustrates a second side view of the top portion of the sliding door of FIG. 2.

FIG. 2 also illustrates that sliding door 110 includes one or more connection plates 215, 220 attached to door panel 115 at opposing ends thereof to facilitate connection between the door panel 115 and various components (e.g., soft-close assembly 205, rollers 405, see FIGS. 4 and 5). For instance, FIGS. 2, 4, and 5 show that sliding door 110 includes a first pair of connection plates 215*a*, 215*b* and a second pair of connection plates 220*a*, 220*b*. In some embodiments, two connection plates 215*a*, 220*a* (one from each pair of connection plates) are disposed on the first face 120 (see FIG. 4) of door panel 115, whereas two connection plates 215*b*, 220*b* are disposed on second face 125 of door panel 115 (see FIGS. 2 and 5). As shown, one or more mounting bolts 225*a*, 225*b* can be utilized to secure each connection plate 215*a*, 215*b*, 220*a*, 220*b* to door panel 115.

Those skilled in the art will recognize, in view of the present disclosure, that the particular arrangement and number of connection plates (e.g., connection plates 215*a*, 215*b*, 220*a*, 220*b*) shown in FIG. 2 is illustrative only and non-limiting. For instance, sliding door panel 115 can include zero, one, two, three, or more than four connection plates. Additionally, those skilled in the art will recognize, in view of the present disclosure, that a connection plate need not include a substantially flat form factor, as shown. For example, a connection plate can include one or more bends to bend over and/or around top edge 230 of door panel 115. Further, those skilled in the art will recognize, in view of the present disclosure, that each connection plate can be secured to door panel 115 by a variety of methods, such as but not limited to fasteners, bolts, adhesives, clamps, and so forth.

Figure 3:
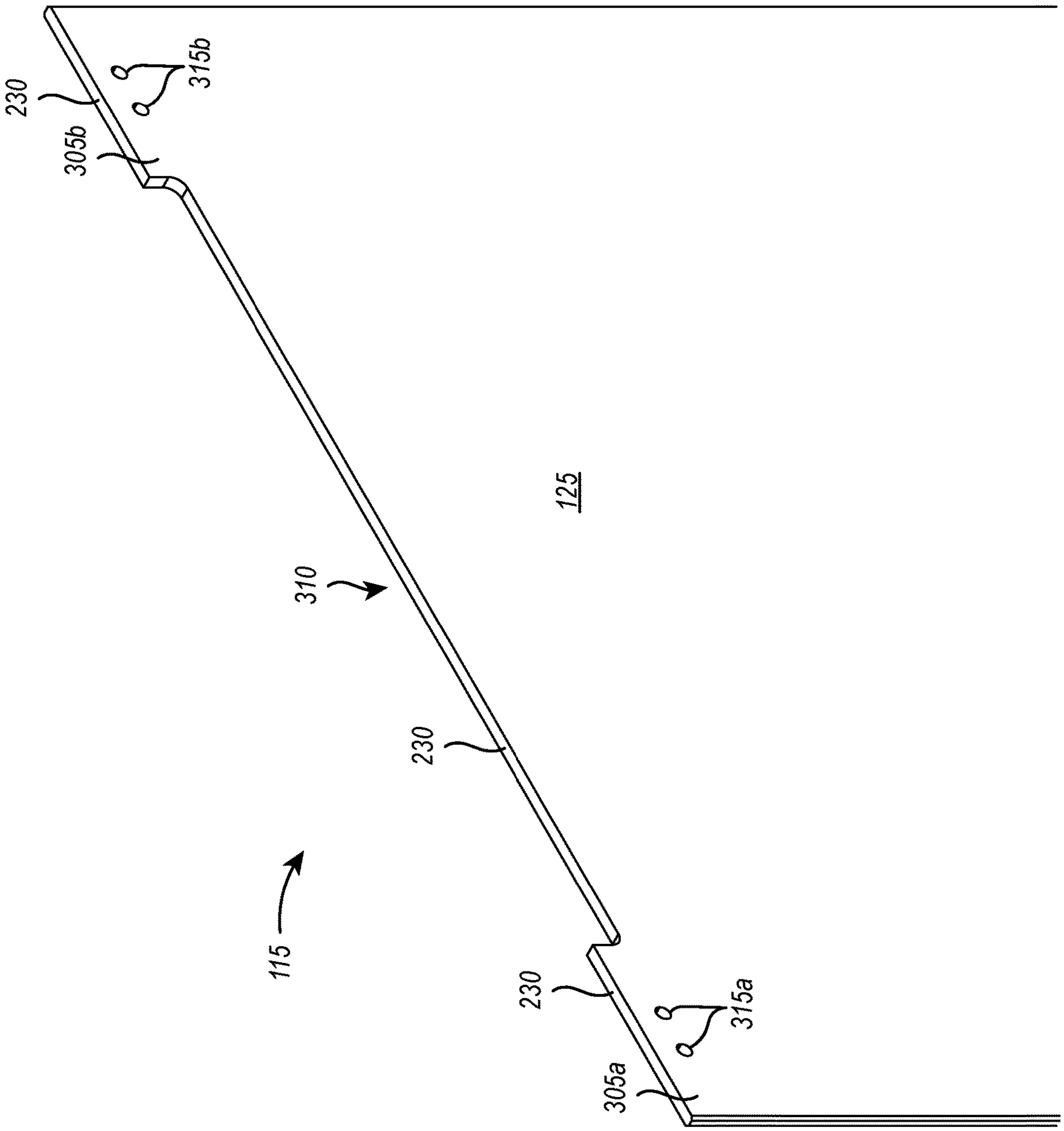
FIG. 3 illustrates a perspective view of a top portion of a door panel of a sliding door according to embodiments of the present disclosure.

FIG. 3 illustrates a perspective view of a top portion of door panel 115 of a sliding door 110, albeit without the attached mounting hardware shown in FIG. 2. In particular, FIG. 3 illustrates that, in some embodiments, a middle portion of top edge 230 of the door panel 115 defines a valley between the ends of the top edge 230 that form first raised portion 305*a* of door panel 115 and a second raised portion 305*b* of door panel 115. As shown, raised portions 305*a*, 305*b* can provide a surface area upon which connection plates 215*a*, 215*b*, 220*a*, 220*b* and/or the rollers 405 can be disposed and secured (see FIGS. 2, 4, and 5). In some embodiments, mounting holes 315*a*, 315*b* are provided within door panel 115, in particular within the raised portions 305*a*/305*b* in this case, to which mounting bolts 225*a*, 225*b* or other fastening means can be secured to support connection plates 215*a*, 215*b*, 220*a*, 220*b*.

Top edge 230 also defines an open space 310 (or valley) in door panel 115 that extends between first raised portion 305*a* and second raised portion 305*b*. In some embodiments, open space 310 provides an area for soft-close assembly 205 to reside within and extend along when affixed to door panel 115 (see FIGS. 2, 4, and 5). The open space 310 or valley portion can comprise a depth if anywhere from 0.01 in. (or about 2.5 mm) to about 3 in. (or about 8 cm), preferably between about 0.25 in (or about 6.35 mm) to about 2 in (or about 5 cm), more preferably about 0.5 in. (or about 1.25 cm) to about 1 in. (or about 2.5 cm). Accordingly, in some embodiments, the rollers 405 (see FIG. 4) and soft-close assembly 205 can be substantially longitudinally aligned along the top portion of sliding door 110 in a horizontally compact manner. Thus, the rollers 405 and soft-close assembly 205 at the top of sliding door 110 can fit within a compact track enclosure (see FIGS. 11 and 12).

FIG. 4 illustrates a first side view (i.e., facing first face 120) of a top portion of sliding door 110. FIG. 4 illustrates a plurality of rollers 405 (i.e., rollers 405*a*, 405*b*) affixed to door panel 115. Rollers 405 can include an axis of rotation that is normal to first face 120 or second face 125 (see FIGS. 2 and 5) of door panel 115. Furthermore, FIG. 4 illustrates an embodiment in which rollers 405 are positioned over first face 120 of door panel 115, as opposed to being vertically offset from door panel 115, while the soft close assembly 205 is positioned within the open space/valley portion 310 of the door 110.

As illustrated, rollers 405*a* are affixed over first raised portion 305*a* and rollers 405*b* are affixed over second raised portion 305*b*. In particular, the rollers 405*a* are affixed to the first pair of connection plates 215*a*, 215*b*, while the rollers 405*b* are affixed to the second pair of connection plates 220*a*, 220*b*. For example, a mounting bolt 225*a*, 225*b* (see FIGS. 2 and 5) can extend through each roller 405 (e.g., any of rollers 405*a*, 405*b*), through a first corresponding connection plate 215*a* or 220*a*, through corresponding holes 315*a* or 315*b* provided in corresponding raised portion 305*a* or 305*b* of door panel 115, and through a second corresponding connection plate 215*b* or 220*b*.

Although FIG. 4 illustrates four rollers, those skilled in the art will recognize, in view of the present disclosure, that sliding door 110 can include any number of rollers. For instance, in some embodiments, sliding door 110 includes only one roller on each raised portion 305*a*, 305*b* of door panel 115. Furthermore, those skilled in the art will recognize, in view of the present disclosure, that the rollers 405*a*, 405*b* can extend at least partially over any edge of door panel 115. Additionally, those skilled in the art will recognize, in view of the present disclosure, that rollers 405*a*, 405*b* can include alternative designs that are currently available for enabling sliding doors to smoothly glide between open and closed positions.

FIG. 5 illustrates a second side view (i.e., facing second face 125) of a top portion of sliding door 110. FIG. 5 shows soft-close assembly 205 secured within open space 310 to both of raised portions 305*a*, 305*b* of door panel 115 and in substantial longitudinal alignment with rollers 405*a*, 405*b*. First and second catches 210*a*, 210*b* of soft-close assembly 205 are oriented (i.e., facing) in the same direction as the normal vector of second face 125 of the door panel (although other orientations are within the scope of this disclosure). Also, first and second catches 210*a*, 210*b* are associated with soft-close dampers 235*a*, 235*b*, respectively, to provide damping (i.e., soft-close functionality) when catches 210*a*, 210*b* come into contact with soft-close actuators 1110*a*, 1110*b* (see FIG. 11) upon opening or closing of sliding door 110.

FIGS. 4 and 5 demonstrate that soft-close assembly 205 can affix to at least one connection plate that is connected to first raised portion 305*a* and can affix to at least one connection plate that is connected to second raised portion 305*b*. For example, FIGS. 4 and 5 illustrate that soft-close assembly 205 is connected to connection plates 215*a* and 215*b* via connection members 505 (e.g., via bolts, rivets, fasteners, or other suitable connection members). Accordingly, in some instances, soft-close assembly 205 and rollers 405 can advantageously affix to door panel 115 via connection plates 215*a*, 215*b*, 220*a*, 220*b*, reducing the number of holes 315*a*, 315*b* that would be cut through door panel 115.

FIGS. 4 and 5 also demonstrate that, in some embodiments, rollers 405 and soft-close assembly 205 do not extend above first raised portion 305*a* or second raised portion 305*b* of door panel 115. This arrangement allows the top portion of sliding door 110 to compactly fit within track enclosure 140 of sliding door system 100 (see, e.g., FIG. 1), allowing for track enclosure 140 itself to have a compact cross-sectional profile. Also, this arrangement allows for top edge 230 of door panel 115 to be concealed within track enclosure 140, as shown in FIG. 1, resulting in an aesthetically seamless design with a minimal number of showing parts.

Figure 6:
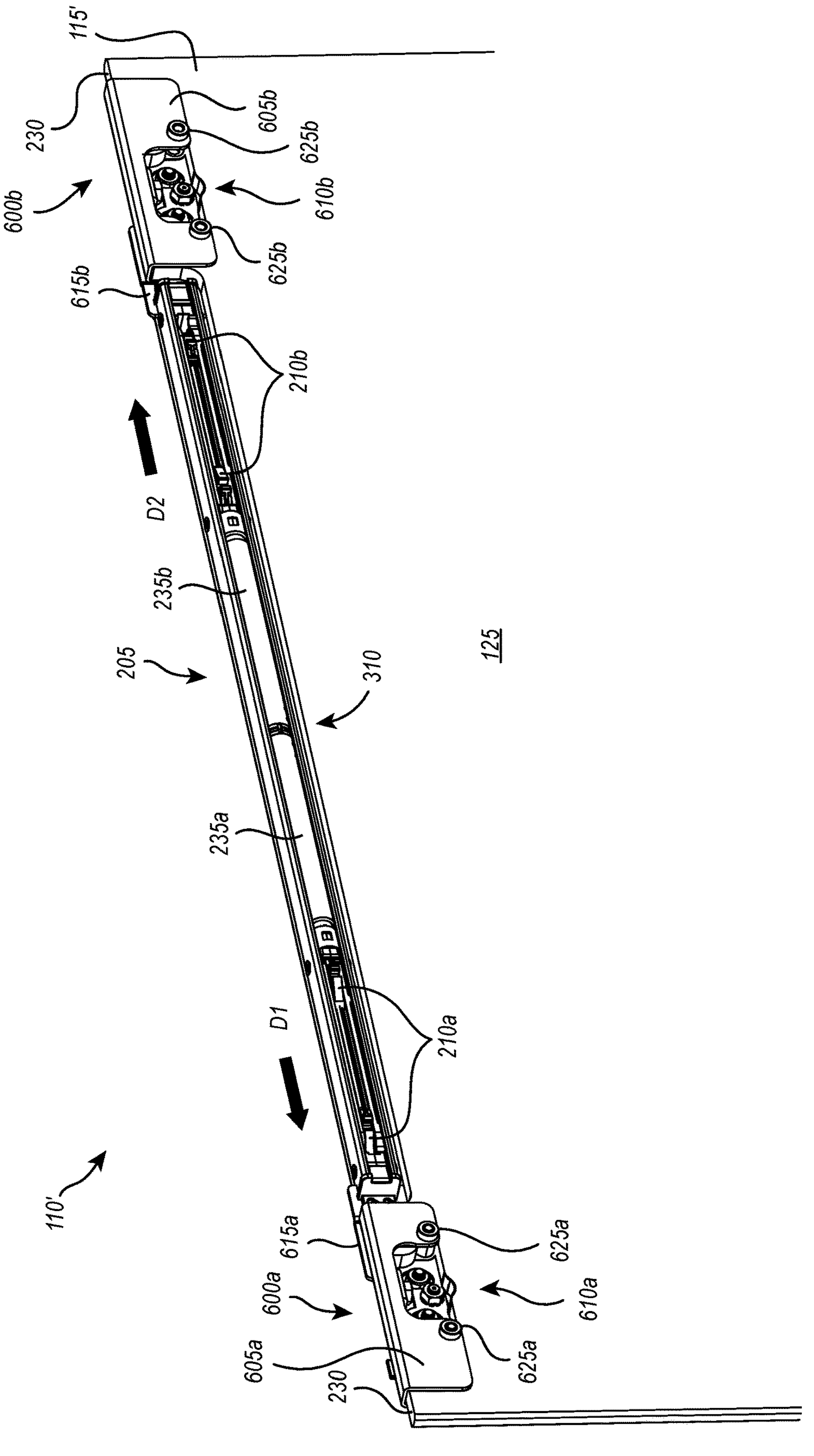
FIG. 6 illustrates a perspective view of a top portion of a sliding door according to embodiments of the present disclosure.

FIG. 6 illustrates a perspective view of a top portion of a sliding door 110' according to additional embodiments of the present disclosure. As shown, sliding door 110' includes soft-close assembly 205 secured at opposing ends to first and second connection assemblies 600*a*, 600*b*, respectively. First and second connection assemblies 600*a*, 600*b* are secured to respective first and second raised portions 305*a*, 305*b* by one or more door panel support rods 625*a*, 625*b*.

Additionally, first and second connection assemblies 600*a*, 600*b* are configured to selectively adjust a leveling of door panel 115' relative to rollers 405*a*, 405*b* (see FIG. 8A) to allow for sliding door 110' to be selectively positioned, or "plumbed," at a desired position/level during installation. For instance, each mounting assembly 600*a*, 600*b* includes a leveling bracket 610*a*, 610*b* that adjustably attached to a corresponding connection plate 615*a*, 615*b*, each connection plate 615*a*, 615*b* being secured to one end of soft-close assembly 205, such that the relative position between respective leveling brackets 610*a*, 610*b* and connection plates 615*a*, 615*b* can be altered to attain a desired leveling of door panel 115', as discussed further in relation to FIGS. 8B and 9B herein.

Figure 7:
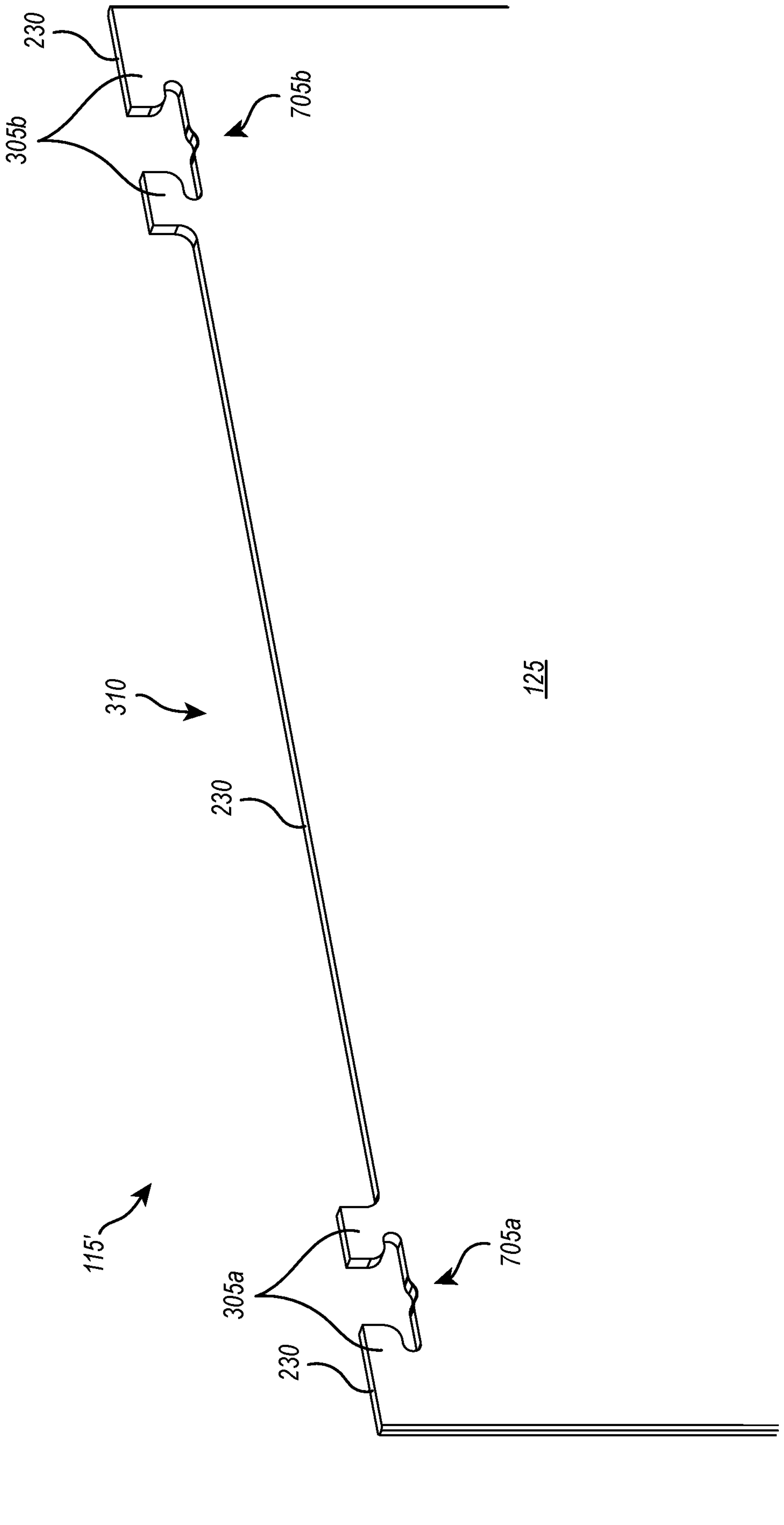
FIG. 7 illustrates a perspective view of a top portion of a door panel of a sliding door according to embodiments of the present disclosure.

FIG. 7 illustrates a perspective view of a top portion of door panel 115' of a sliding door 110'. In particular, FIG. 3 illustrates that top edge 230 of door panel 115' defines first raised portion 305*a* and second raised portion 305*b*. As shown, raised portions 305*a*, 305*b* can provide a surface area upon which connection assemblies 600*a*, 600*b* can be disposed and secured (see FIGS. 2, 4, and 5). In some embodiments, cutouts 705*a*, 705*b* are provided within door panel 115', shaped and sized to enable leveling brackets 605*a*, 605*b* to be mounted thereto in a compact and secure configuration that can fit within track enclosure 140 (see FIGS. 11 and 12).

Figure 8A:
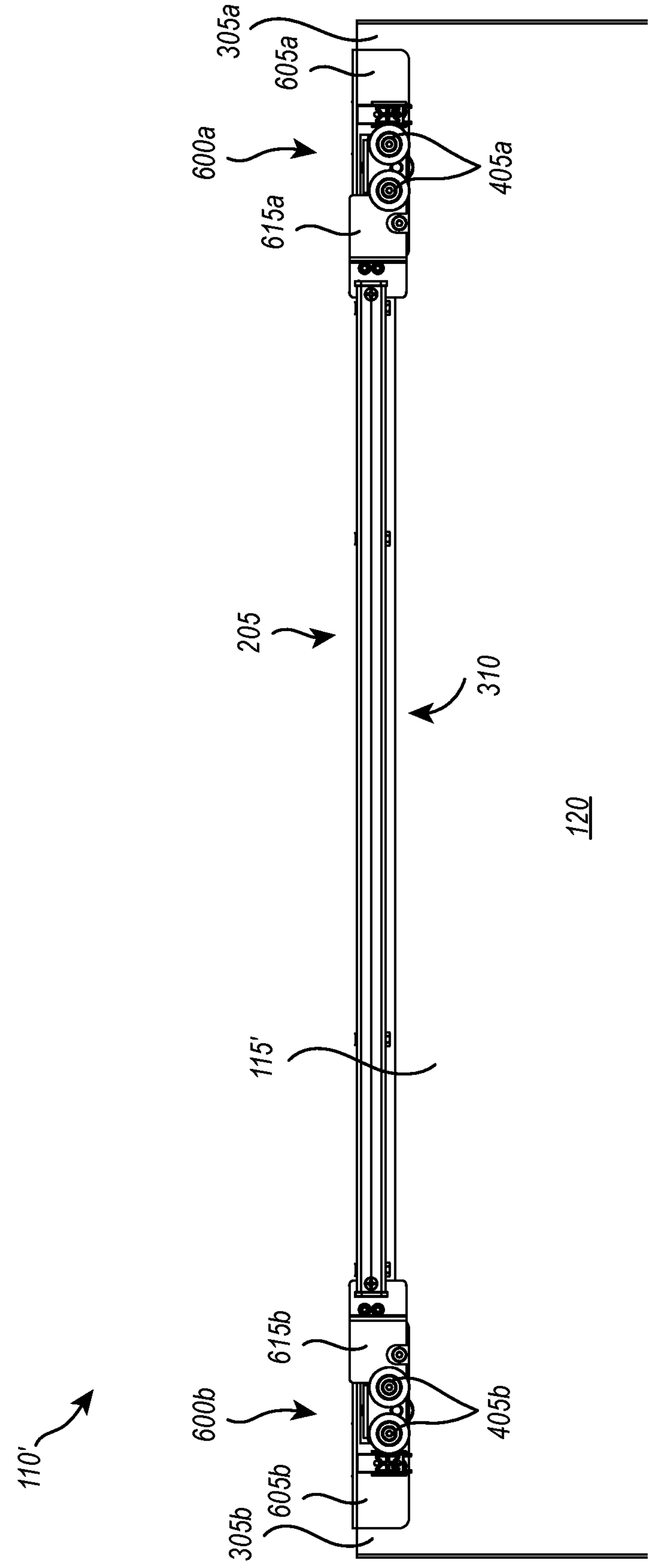
FIG. 8A illustrates a first side view of a top portion of the sliding door of FIG. 6.
Figure 9A:
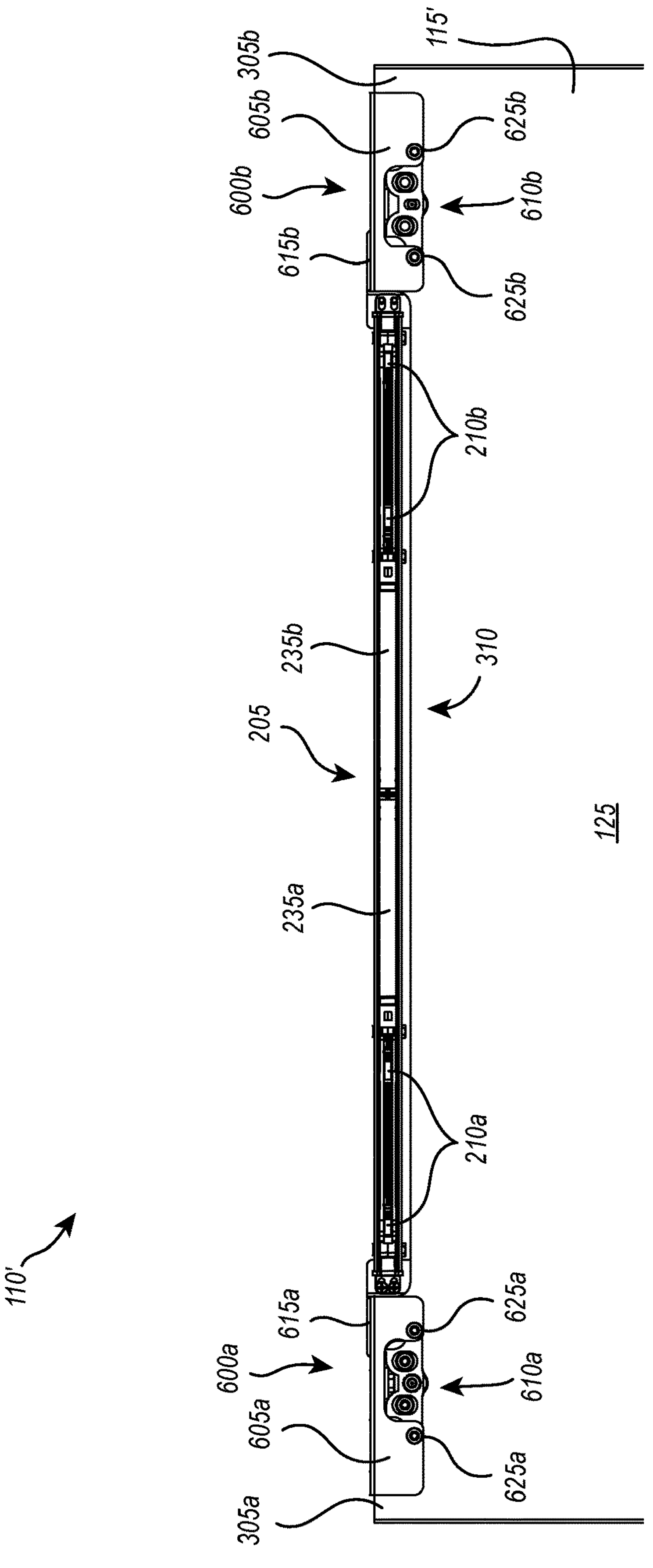
FIG. 9A illustrates a second side view of the top portion of the sliding door of FIG. 6.

As shown, top edge 230 also defines open space 310 in door panel 115', extending between first raised portion 305*a* and second raised portion 305*b*, open space 310 providing an area for soft-close assembly 205 to reside within and extend along when affixed to door panel 115 (see FIGS. 6, 8A, and 9A). Accordingly, in some embodiments, the rollers 405 (see FIG. 8A) and soft-close assembly 205 can be substantially longitudinally aligned along the top portion of sliding door 110' in a horizontally compact manner. Thus, the rollers 405 and soft-close assembly 205 at the top of sliding door 110' can fit within a compact track enclosure (see FIGS. 11 and 12).

FIG. 8A illustrates a first side view (i.e., facing first face 120) of a top portion of sliding door 110'. FIG. 8A illustrates a plurality of rollers 405 (i.e., rollers 405*a*, 405*b*) affixed to door panel 115' via connection assemblies 600*a*, 600*b*. Rollers 405 can include an axis of rotation that is normal to first face 120 or second face 125 (see FIGS. 6 and 9A) of door panel 115'. Furthermore, FIG. 8A illustrates an embodiment in which rollers 405 are positioned over first face 120 of door panel 115', as opposed to being vertically offset from door panel 115'. As illustrated, rollers 405*a* are affixed over first raised portion 305*a* and rollers 405*b* are affixed over second raised portion 305*b*. In particular, the rollers 405*a* are affixed to connection plate 615*a* while the rollers 405*b* are affixed to connection plate 615*b*.

Although FIG. 8A illustrates four rollers, those skilled in the art will recognize, in view of the present disclosure, that sliding door 110' can include any number of rollers. For instance, in some embodiments, sliding door 110' includes only one roller on each raised portion 305*a*, 305*b* of door panel 115'. Furthermore, those skilled in the art will recognize, in view of the present disclosure, that the rollers 405*a*, 405*b* can extend at least partially over any edge of door panel 115'. Additionally, those skilled in the art will recognize, in view of the present disclosure, that rollers 405*a*, 405*b* can include alternative designs that are currently available for enabling sliding doors to smoothly glide between open and closed positions.

Figure 8B:
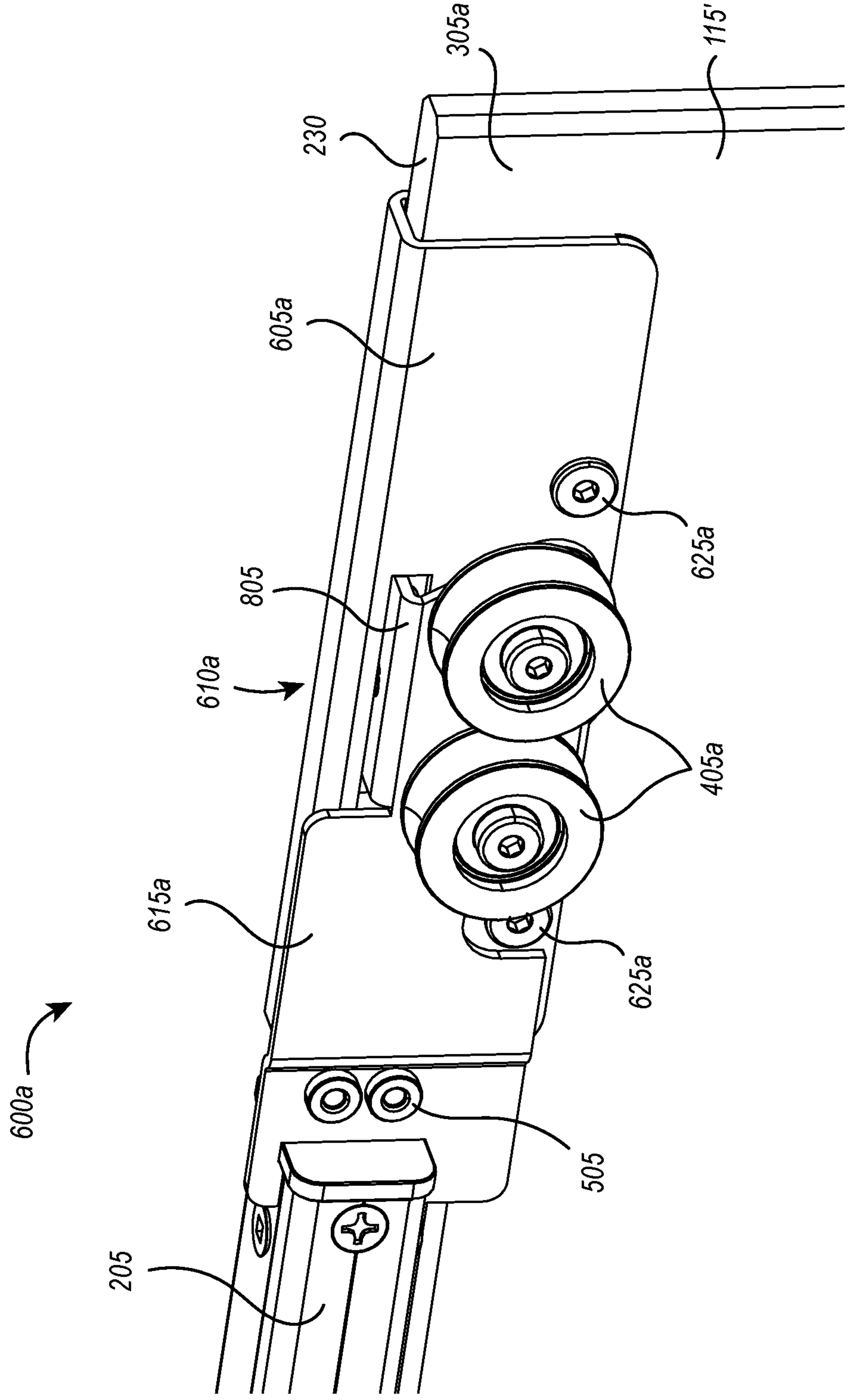
FIG. 8B illustrates a first side view of an attachment assembly of the sliding door of FIG. 6.

FIG. 8B illustrates a detailed view of a first side of mounting assembly 600*a* secured to soft-close assembly 205 via connection members 505 secured to connection plate 615*a*. As shown, connection plate 615*a* includes a horizontal flange 805 associated with leveling bracket 610*a* to enable adjustment of a position of connection plate 615*a* relative to leveling bracket 610*a* by adjustment of a relative vertical position of first horizontal flange 805. Adjustment of the relative vertical position of first horizontal flange 805 thus results in adjustment of a vertical position of rollers 405*a* relative to door panel 115', such that the relative level of door panel 115' is adjusted when rollers 405*a* are associated with roller track 1105 of track enclosure 140 (see FIGS. 11 and 12). Similar adjustments can be made to the relative position of rollers 405*b* by adjustment via leveling bracket 605*b* of mounting assembly 600*b*.

FIG. 9A illustrates a second side view (i.e., facing second face 125) of a top portion of sliding door 110'. FIG. 9A shows soft-close assembly 205 secured within open space 310 to both of raised portions 305*a*, 305*b* of door panel 115' and in substantial longitudinal alignment with rollers 405*a*, 405*b*. First and second catches 210*a*, 210*b* of soft-close assembly 205 are oriented (i.e., facing) in the same direction as the normal vector of second face 125 of the door panel (although other orientations are within the scope of this disclosure).

FIGS. 8A and 9A demonstrate that soft-close assembly 205 can affix to opposing connection plates that are connected to first raised portion 305*a* and second raised portion 305*b*, respectively. For example, FIGS. 8A and 9A illustrate that soft-close assembly 205 is connected to connection plates 615*a* and 615*b* via connection members 505 (e.g., via bolts, rivets, fasteners, or other suitable connection members). Accordingly, in some instances, soft-close assembly 205 and rollers 405 can advantageously affix to door panel 115' via connection plates 615*a*, 615*b*, reducing the size of cutouts 705*a*, 705*b* (see FIG. 7) or number of holes that would be cut through door panel 115'.

FIGS. 8A and 9A also demonstrate that, in some embodiments, rollers 405 and soft-close assembly 205 do not extend above first raised portion 305*a* or second raised portion 305*b* of door panel 115'. This arrangement allows the top portion of sliding door 110' to compactly fit within track enclosure 140 of sliding door system 100 (see, e.g., FIG. 1), allowing for track enclosure 140 itself to have a compact cross-sectional profile. Also, this arrangement allows for top edge 230 of door panel 115' to be concealed within track enclosure 140, as shown in FIG. 1, resulting in an aesthetically seamless design with a minimal number of showing parts.

Figure 9B:
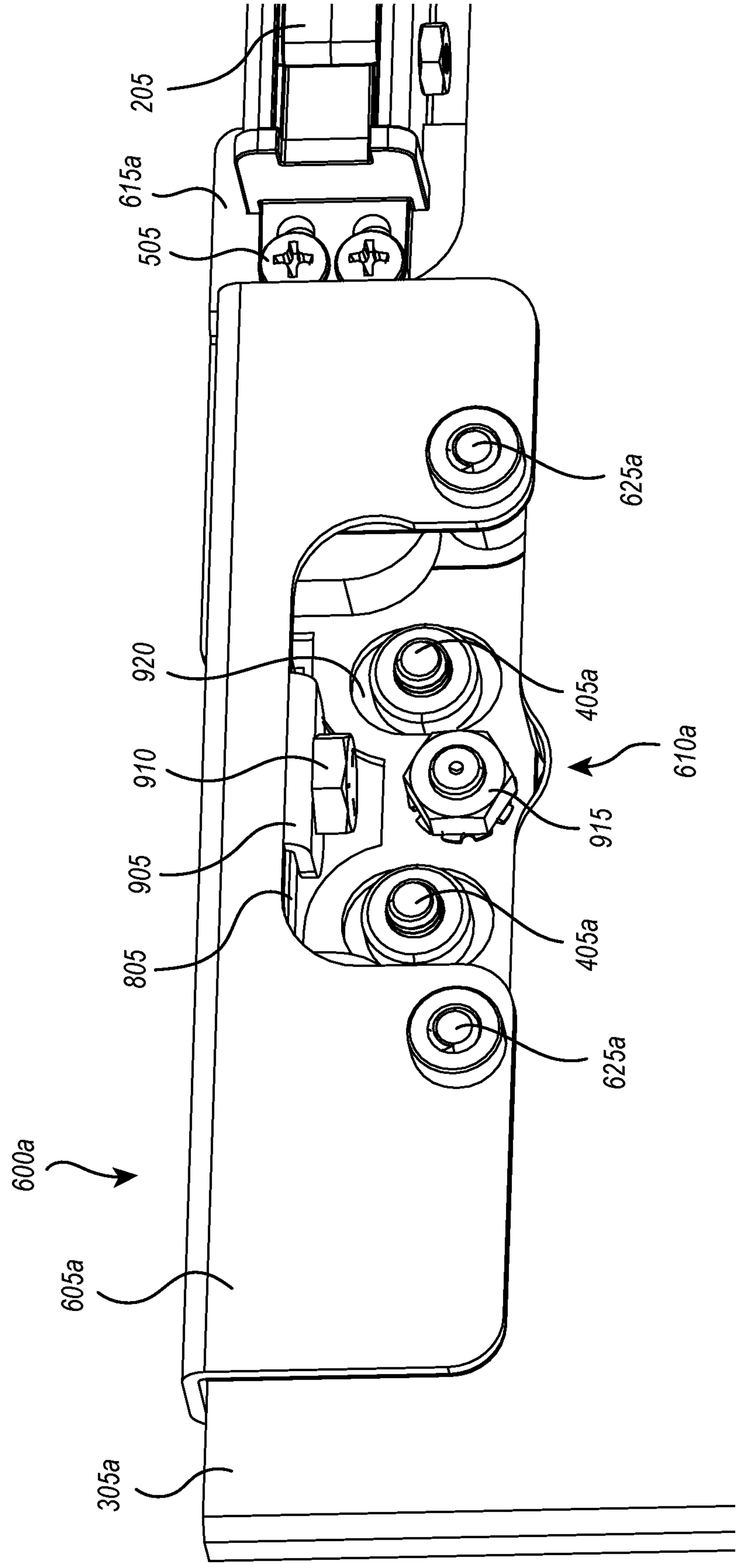
FIG. 9B illustrates a second side view of an attachment assembly of the sliding door of FIG. 6.

FIG. 9B illustrates a detailed view of a second side of mounting assembly 600*a* secured to soft-close assembly 205 via connection members 505 secured to connection plate 615*a*. As shown, first horizontal flange 805 of connection plate 615*a* is directly associated with a second horizontal flange 905 of leveling bracket 605*a*, such that a relative distance between the two flanges can be adjusted by leveling bolt 910. Leveling bracket 605*a* also includes a securement bolt 915 associated with connection plate 615*a*, such that securement bolt 915 is configured to lock the relative positions of leveling bracket 605*a* and connection plate 615*a* in place. Accordingly, an installer can first level or plumb door panel 115' as desired, then secure the position thereof by tightening securement bolt 915. As also illustrated, some embodiments of leveling bracket 605*a* includes elongated holes 920 to prevent rollers 405*a* (and any hardware associated therewith) from interfering with the leveling functionality of connection bracket 605*a*, such that rollers 405*a* can be repositioned vertically within elongated holes 920 as the vertical position of connection plate 615*a* is adjusted relative to leveling bracket 605*a*.

Figure 10A:
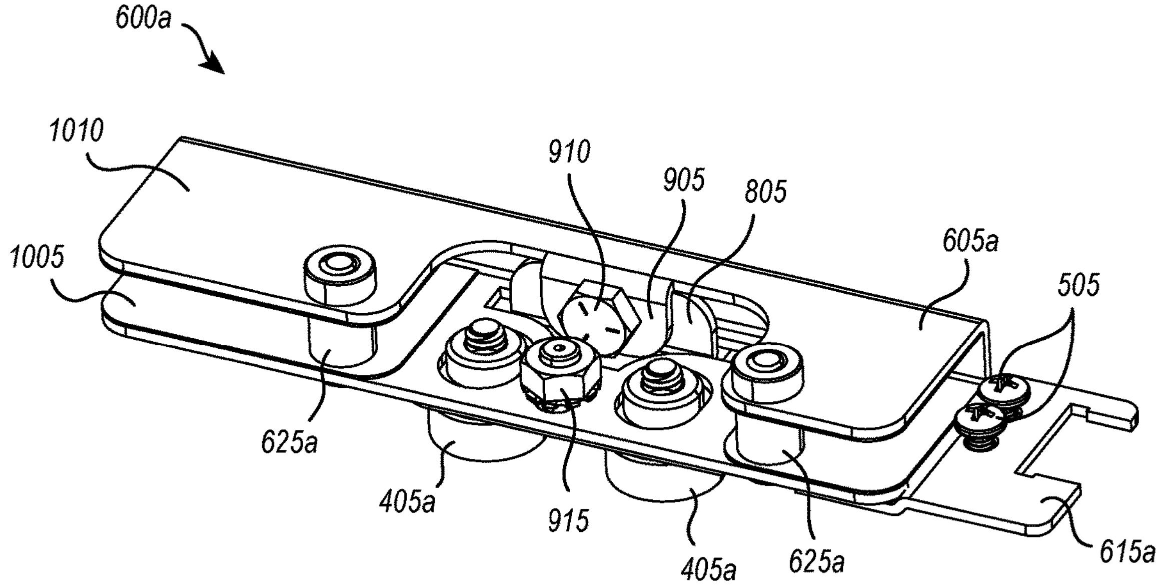
FIG. 10A illustrates a bottom perspective view of a sliding door attachment assembly according to embodiments of the present disclosure.
Figure 10B:
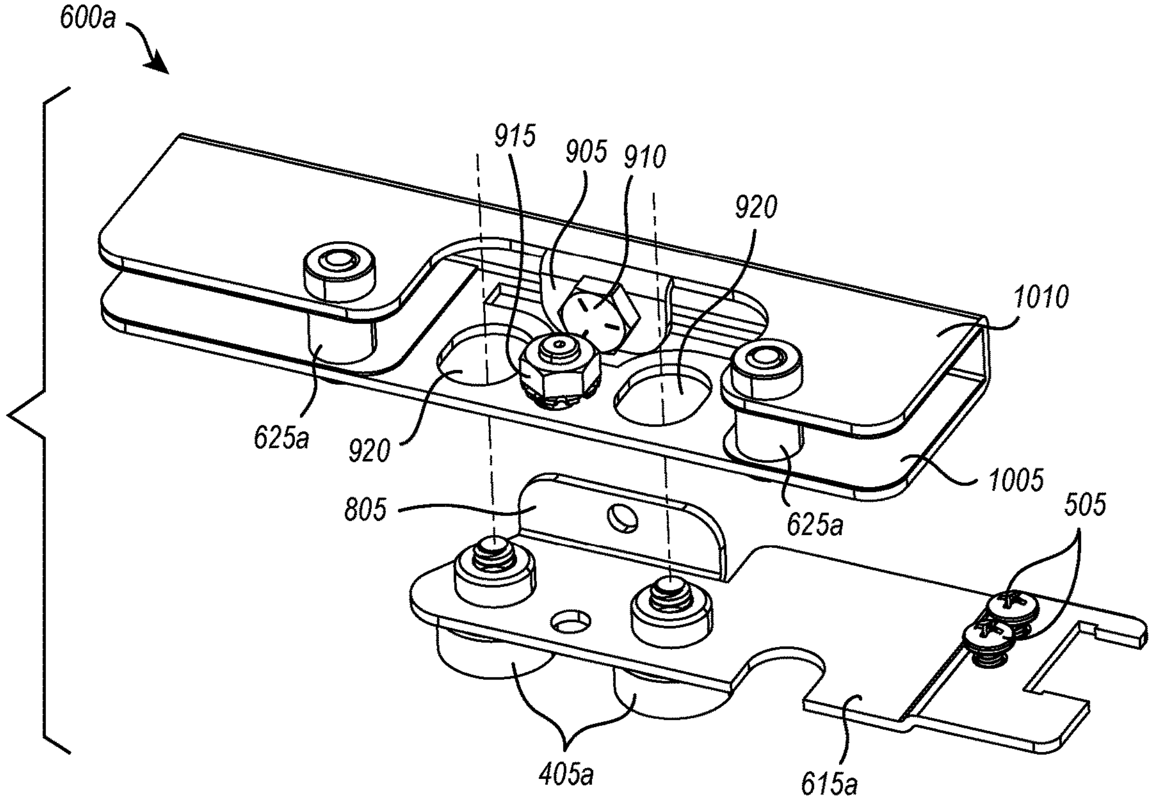
FIG. 10B illustrates an exploded bottom perspective view thereof.
Figure 10C:
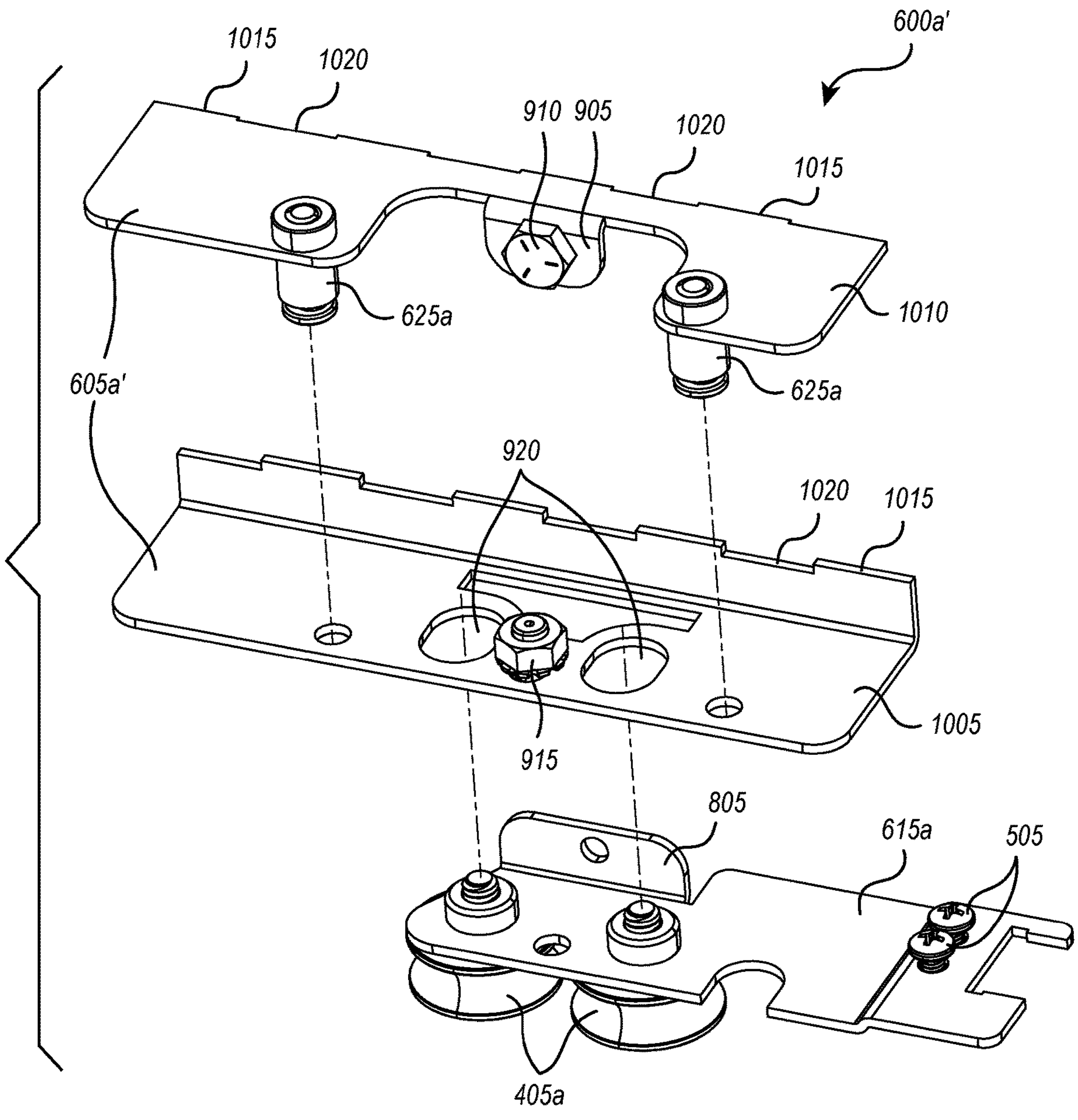
FIG. 10C illustrates a bottom perspective view of a disassembled sliding door attachment assembly according to embodiments of the present disclosure.

FIGS. 10A through 10C illustrate embodiments of mounting assembly 600*a* in a variety of configurations. Specifically, FIG. 10A illustrates mounting assembly 600*a* in an assembled configuration and FIG. 10B illustrates mounting assembly 600*a* with leveling bracket 610*a* and connection plate 615*a* separated. FIGS. 10A and 10B illustrate leveling bracket 610*a* having first and second vertical plates 1005, 1010 fixed to one another in an integral part, whereas FIG. 10C illustrates an exploded view of an alternative embodiment having a leveling bracket 605*a'* have separable first and second vertical plates 1005, 1010.

Those skilled in the art will recognize, in view of the present disclosure, that the illustrated embodiments of mounting assembly 600*a* and 600*a'* are interchangeable, and that mounting assembly 600*b* (see FIGS. 8A and 9A) includes the same features and components as mounting assembly 600*a*, although being configured for installation on an opposite end of a door panel.

As shown in FIGS. 10A and 10B, connection plate 615*a* is separable from leveling bracket 605*a*. For instance, leveling bracket 605*a* can be installed on a door panel, such as door panel 115' of FIG. 7, using door panel support rods 625*a*, before or after securing connection plate 615*a* to leveling bracket 605*a* by aligning first and second horizontal flanges 805, 905 and securing leveling bolt 910 thereto. Also, soft-close assembly 205 (see FIG. 6) can be secured to connection plate 615*a* via connection members 505 before or after connection plate 615*a* has been secured to leveling bracket 605*a*. With rollers 405*a* mounted to a roller track, leveling bolt 910 can then be adjusted to alter the leveling of the corresponding door panel by adjusting a vertical position of connection plate 615*a* relative to leveling bracket 605*a*. When a desired level of the door panel has been attained, securement bolt 915 can be tightened to lock the relative vertical position of connection plate 615*a* and prevent inadvertent alteration of the leveling of the corresponding door panel.

Figure 14:
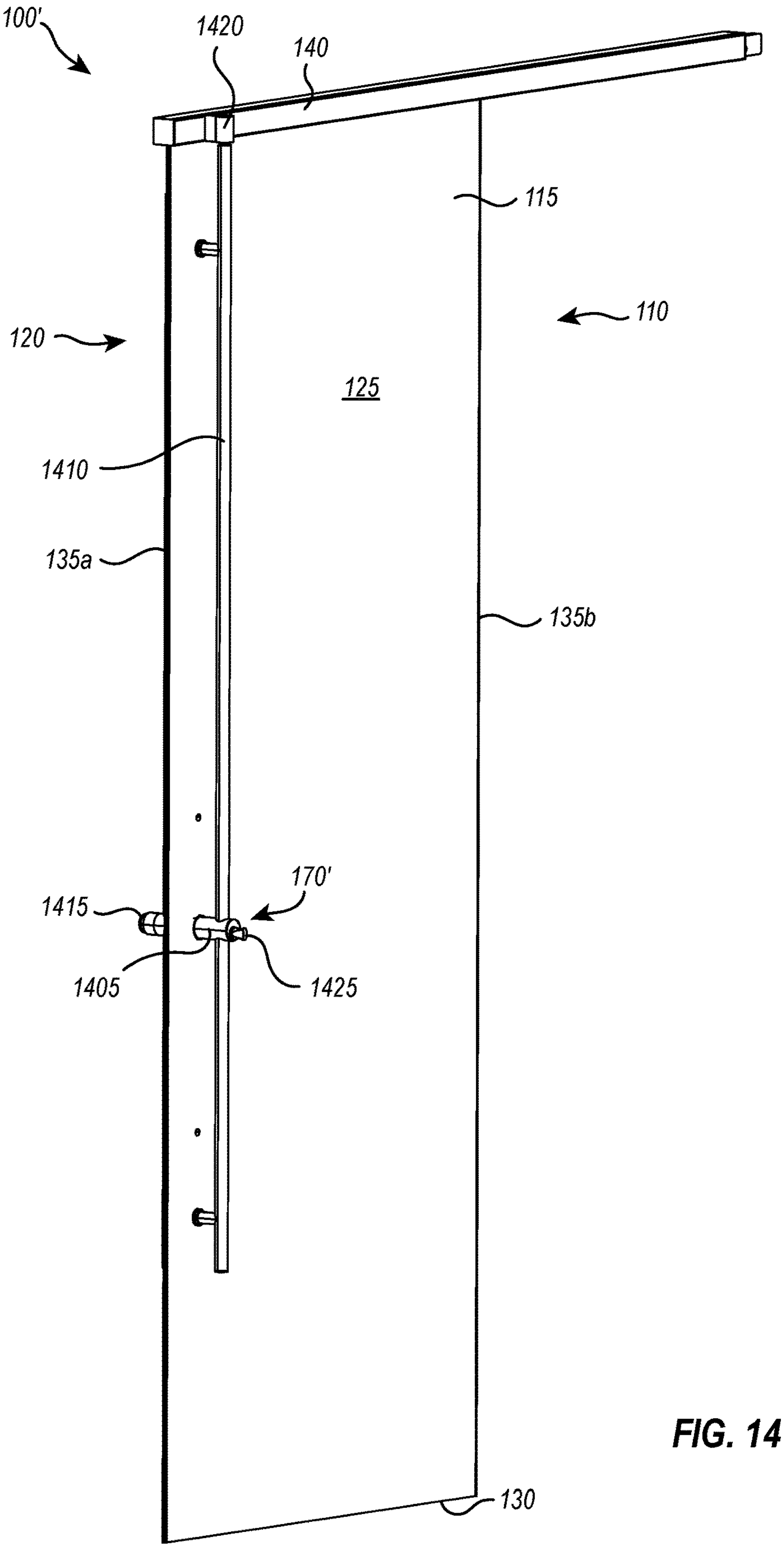
FIG. 14 illustrates a perspective view of a sliding door system according to embodiments of the present disclosure.

As illustrated, rollers 405*a* can be at least partially inserted within elongated holes 920 of leveling bracket 605*a*, such that a compact profile of mounting assembly 600*a* is achieved. The resulting compact design allows for a correspondingly compact track enclosure 140, as shown in FIGS. 1 and 14.

FIG. 10C illustrates mounting assembly 600*a*' having a leveling bracket 605*a*' with separable first and second vertical plates 1005, 1010. As shown, first and second vertical plates 1005, 1010 can be secured to one another with door panel support rods 625*a*. First and second vertical plates 1005, 1010 of leveling bracket 605*a*' also include alternating and corresponding protrusions 1015 and depressions 1020 to ensure proper alignment and prevent horizontal movement. Separable first and second vertical plates 1005, 1010 of leveling bracket 605*a*' present improved manufacturability as the separate parts can more easily be produced.

Figure 11:
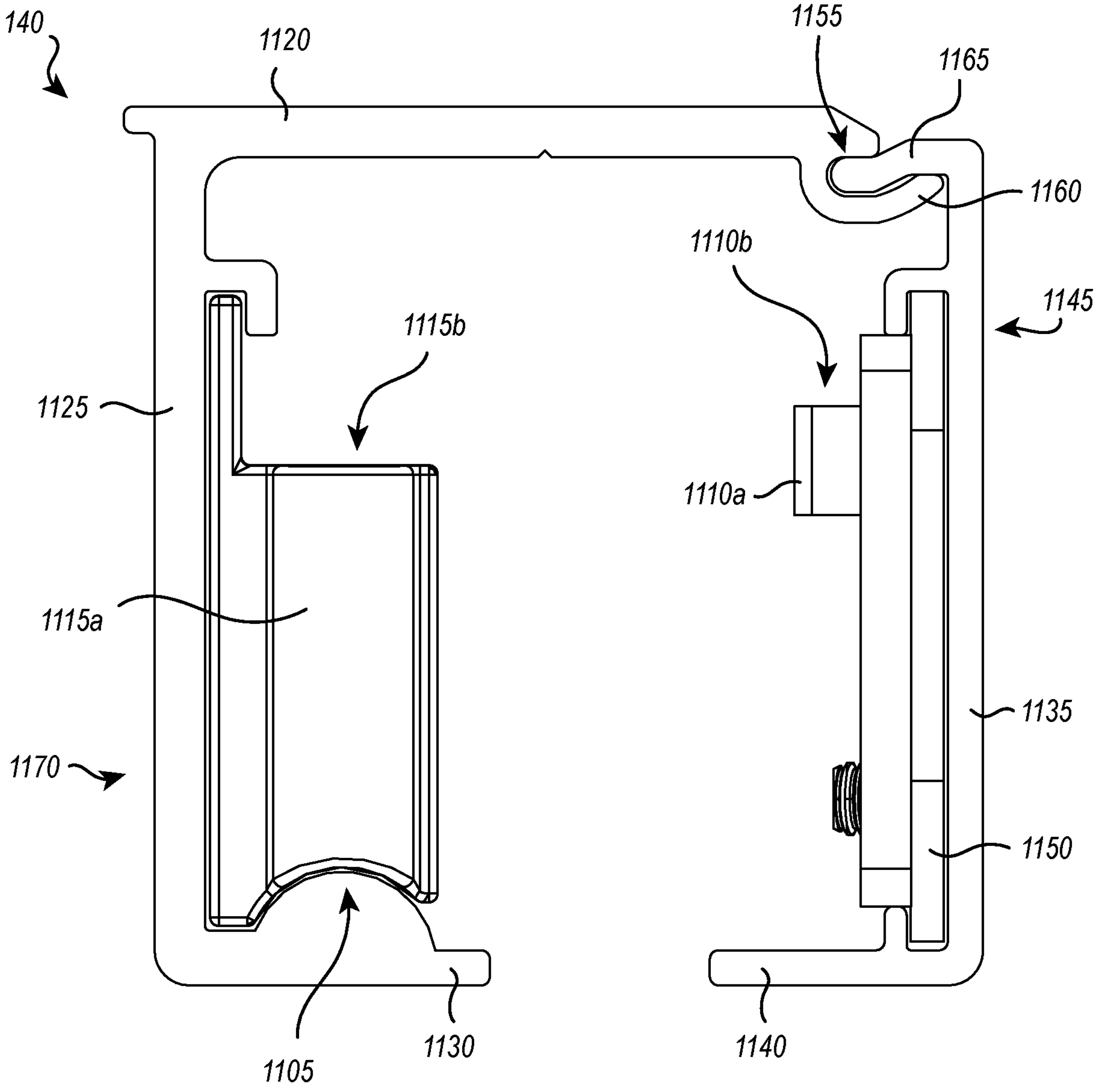
FIG. 11 illustrates a front cross-sectional view of a track enclosure according to embodiments of the present disclosure.
Figure 12:
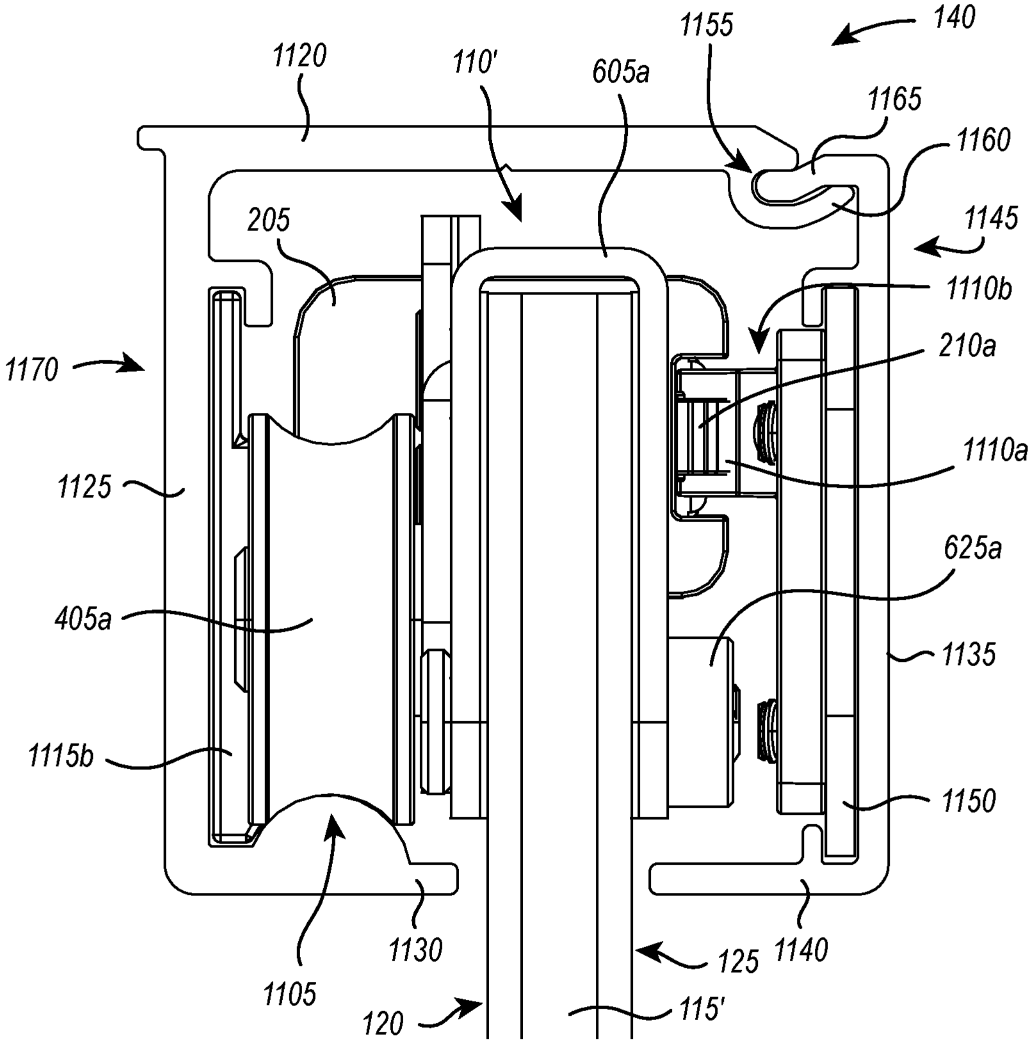
FIG. 12 illustrates a front cross-sectional view of a track enclosure with a sliding door arranged therein according to embodiments of the present disclosure.

FIG. 11 illustrates a front cross-sectional view of a track enclosure 140. FIG. 12 illustrates a front cross-sectional view of track enclosure 140 with the top portion of sliding door 110 arranged therein. In some embodiments, track enclosure 140 has a substantially square, compact cross-section, enabled by the compact arrangement of rollers 405 and soft-close assembly 205 on door panel 115 of sliding door system 100.

FIGS. 11 and 12 illustrate that track enclosure 140 includes a roller track 1105 disposed therein. FIGS. 11 and 12 show that roller track 1105 being an elongate track that has a convex curvature, rollers 405 having a concave curvature that corresponds to the convex curvature of roller track 1105. The complementary curvatures of roller track 1105 and rollers 405 movably secures rollers 405 to roller track 1105 when sliding door 110 translates between closed and open positions.

Those skilled in the art will recognize, in view of the present disclosure, that the curvatures of roller track 1105 and rollers 405 are illustrative only and non-limiting. For instance, in some embodiments, rollers 405 have a convex curvature and roller track 1105 has a complementary concave curvature. In some embodiments, rollers 405 and roller track 1105 do not have any such curvature, but rather form a flat interface with one another.

As illustrated, track enclosure 140 also includes one or more roller stoppers 1115*a*, 1115*b* proximate to opposing ends thereof to prevent rollers 405 from exiting roller track 1105 when any of catches 210*a*, 210*b* or soft-close actuators 1110*a*, 1110*b* are disengaged. As shown in FIG. 11, for example, roller stopper 1115*a* is secured to track enclosure 140 to prevent roller(s) 405*a* (not shown) from exiting the open end of track enclosure 140 (i.e., towards the viewer), whereas roller stopper 1115*b* is positioned at an opposite end of track enclosure 140, behind roller stopper 1115*a* from the view presented, to prevent roller(s) 405*b* from exiting the opposing open end of track enclosure 140 (i.e., away from the viewer).

FIG. 12 illustrates track enclosure 140 with sliding door 110' installed therein. Roller stopper 1115*a* is removed from FIG. 12 to allow visibility of roller 405*a*. When roller stopper 1115*a* is installed as shown in FIG. 11, roller 405*a* is prevented from exiting towards the viewer. Additionally, roller stoppers 1115*a*, 1115*b* can also include a convex curvature corresponding to a curvature of rollers 405, similar to the convex curvature of the roller track 1105.

FIGS. 11 and 12 also illustrate that track enclosure 140 having one or more soft-close actuators 1110*a*, 1110*b* disposed therein. Soft-close actuator 1110*b* is positioned behind soft-close actuator 1110*a* from the view presented in FIGS. 11 and 12. In the illustrated embodiment, soft-close actuators 1110*a*, 1110*b* are engageable with first and second catches 210*a*, 210*b*, respectively, of soft-close assembly 205 of sliding door 110 (see FIG. 12). When either of catches 210*a*, 210*b* comes into contact with respective soft-close actuator 1110*a*, 1110*b*, the corresponding soft-close damper 235*a*, 235*b* (see FIGS. 2 and 6) engages to dampen the force of contact to soften the resultant stopping of sliding door 110 and thus prevent an abrupt, jarring stop and resultant damage to the components thereof.

Thus, in some embodiments, soft-close actuator 1110*a* is configured to provide soft-close functionality in a first direction D1 (e.g., while sliding door 110 in a direction to close sliding door 110), whereas soft-close actuator 1110*b* is configured to provide soft-close functionality in a second direction D2 (e.g., while sliding door 110 in a direction to open sliding door 110).

Those skilled in the art will appreciate, in view of the present disclosure, that the particular arrangement of roller track 1105 and soft-close actuators 1110*a*, 1110*b* within track enclosure 140 can vary in different embodiments within the scope of the present disclosure. For example, FIGS. 11 and 12 illustrate an embodiment in which track enclosure 140 includes a top wall 1120, a first vertical wall 1125, a first bottom wall 1130, a second vertical wall 1135, and a second bottom wall 1140.

In some instances, first vertical wall 1125 is configured to be disposed over at least a portion of first face 120 of door panel 115 when rollers 405 of sliding door 110 are arranged on roller track 1105 within track enclosure 140 (see FIG. 12). Furthermore, in some instances, first bottom wall 1130 defines roller track 1105 and extends from first vertical wall 1125 toward door panel 115 when rollers 405 of sliding door 110 are arranged on roller track 1105 within track enclosure 140 (see FIG. 12).

In some instances, second vertical wall 1135 secures and supports soft-close actuators 1110*a*, 1110*b* and is configured to be disposed over at least a portion of second face 125 of door panel 115 when rollers 405 of sliding door 110 are arranged on roller track 1105 within track enclosure 140 (see FIG. 12). Furthermore, in some instances, second bottom wall 1140 extends from second vertical wall 1135 toward door panel 115 when rollers 405 of sliding door 110 are arranged on roller track 1105 within track enclosure 140 (see FIG. 12).

FIGS. 11 and 12 illustrate that, in some embodiments, second vertical wall 1135 and second bottom wall 1140 compose a covering plate 1145 of track enclosure 140. Covering plate 1145 can operate as a blocking member that retains rollers 405 and soft-close assembly 205 of sliding door within track enclosure 140 when rollers 405 of sliding door 110 are arranged on roller track 1105 within track enclosure 140. Additional structural support can be provided by a spline plate 1150 associated with covering plate 1145 and actuators 1110*a*, 1110*b*.

In some embodiments, covering plate 1145 is selectively removable from track enclosure 140. In some embodiments, top wall 1120 of track enclosure 140 includes a channel 1155 that has a shelf 1160 extending from a bottom channel wall of channel 1155. Covering plate 1145 can include a protrusion 1165 configured for removable insertion into channel 1155. The protrusion 1165 can also be configured to rest on shelf 1160 when protrusion 1165 resides within channel 1155.

FIGS. 11 and 12 also illustrate that some embodiments of track enclosure 140 includes an enclosure bracket 1170 composed of top wall 1120, first vertical wall 1125, and first bottom wall 1130 extending from first vertical wall 1125 towards door panel 115 (or door panel 115') when installed. As shown, first bottom wall 1130 defines roller track 1105 on an inside surface thereof, such that enclosure bracket 1170 is configured to provide a track for rollers 405 and to at least partially enclose rollers 405 therein. Also, first vertical wall 1125 of enclosure bracket 1170 is configured to be disposed over at least a portion of first face 120 of door panel 115 (or door panel 115') when rollers 405 are installed on roller track 1105 (see FIG. 12).

As illustrated, covering plate 1145 is removably securable to enclosure bracket 1170, such that, when secured to enclosure bracket 1170, second vertical wall 1135 is disposed over at least a portion of second face 125 of door panel 115 (or door panel 115') when rollers 405 of sliding door 110 (or 110') are arranged on roller track 1105 within track enclosure 140. Also, second bottom wall 1140 of covering plate 1145 is configured to extend toward second face 125 when installed, thus at least partially concealing the various components encased within track enclosure 140 (e.g., roller track 1105, rollers 405, soft-close assembly 205, and connection assemblies 600*a*, 600*b* or connection plates 215*a*, 215*b*, 220*a*, 220*b*).

Figure 13:
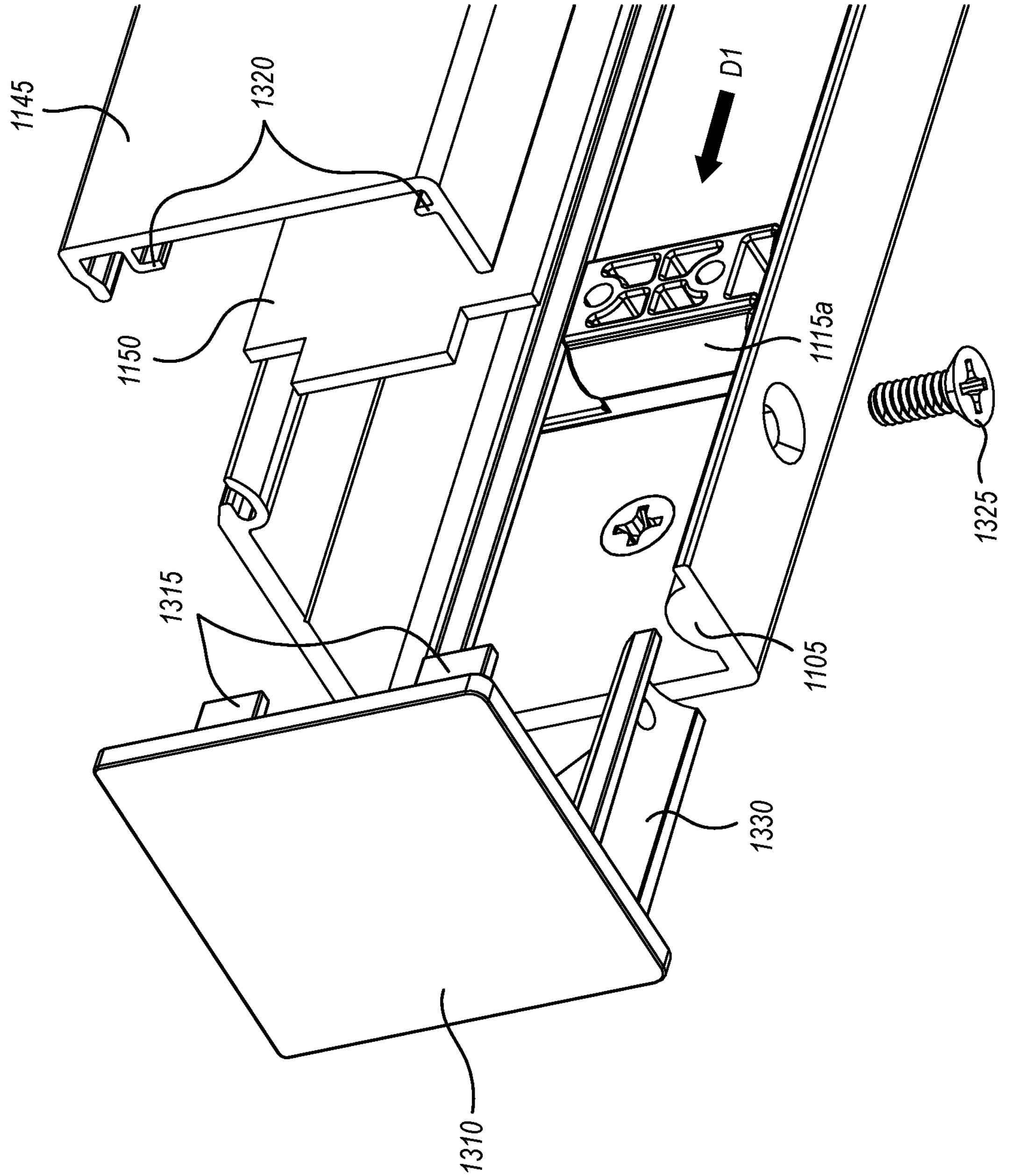
FIG. 13 illustrates an exploded bottom perspective view of a track enclosure according to embodiments of the present disclosure.

In some instances, covering plate 1145 is selectively lockable to track enclosure 140 when covering plate 1145 is engaged with top wall 1120 as described above and shown in FIGS. 11 and 12. FIG. 13 illustrates an exploded bottom perspective view of a track enclosure 140. FIG. 13 illustrates that track enclosure 140 can include end caps 1310 configured to enclose over opposing ends of track enclosure 140. End caps 1310 can include one or more inserts 1315 configured for insertion into one or more openings 1320 of covering plate 1145. End caps 1310 can also be configured to secure to other portions of track enclosure 140 (e.g., via screw 1325 threading through end cap 1310 and through first bottom wall 1130 of covering plate 1145).

Accordingly, FIG. 13 shows an embodiment in which covering plate 1145 can lock to track enclosure 140 when end caps 1310 are secured over opposing ends of track enclosure 140 and covering plate 1145 can unlock from track enclosure 140 when end caps 1310 are removed from opposing ends of track enclosure 140. For example, covering plate 1145 can lock to track enclosure 140 after removable engagement with top wall 1120 by advancing inserts 1315 of end cap(s) 1310 into one or more openings 1320 of covering plate 1145 and securing end cap(s) 1310 to one of top wall 1120, first vertical wall 1125, or first bottom wall 1130. Securing end cap(s) 1310 can also be secured to enclosure bracket 1170 by sliding tab 1330 onto roller track 1105 and securing it thereto with screw 1325.

FIG. 13 also illustrates that track enclosure 140 can include roller stopper 1115*a* configured to prevent roller(s) 405*a* (when installed on roller track 1105, as shown in FIG. 12) from exiting track enclosure 140 at the end shown and prevent roller(s) 405*a* from dislodging or damaging end cap 1310 when sliding door 110 (or 110') is moved in first direction D1. Those skilled in the art will appreciate that, in view of the present disclosure, track enclosure 140 can include the same features and components at an opposite end thereof to achieve the same functionalities with respect to second direction D2 (see FIGS. 2 and 6).

FIG. 14 illustrates a perspective view of a sliding door system 100' having a sliding door 110, a track enclosure 140, and a locking handle assembly 170'. The sliding door 110' of FIG. 14 includes a door panel 115 that has a first face 120 and a second face 125 that are opposite to one another. In other words, first face 120 and second face 125 have normal vectors that face opposite directions. The door panel also includes a bottom edge 130, a top edge that is opposite to the bottom edge 130 (see top edge 230, FIGS. 3 and 7), and opposing vertical edges 135*a*, 135*b* that extend between bottom edge 130 and top edge 230.

In some embodiments, to enable locking functionality from both sides of the sliding door 110, both a key cylinder 1415 on a first side of door panel 115 and a rotatable knob 1425 on a second side of door panel 115 are provided. However, those skilled in the art will recognize in view of the present disclosure, that, in some embodiments, the positioning of first key cylinder 1415 and rotatable knob 1425 on the locking handle assembly 170' can be reversed. Also, one will appreciate, in view of the present disclosure, that two key cylinders 1415 or two rotatable knobs 1425 can be provided (i.e., one on each side of door panel 115. Furthermore, one will appreciate, in view of the present disclosure, that, in some embodiments, sliding door system 100' is only made lockable from one side of sliding door 110.

FIG. 14 also shows track enclosure 140 of the sliding door system 100 having a locking pin receiver 1420 configured to interact with locking handle assembly 170' to selectively lock or unlock the sliding door system 100'. Locking handle assembly 170' is affixed to door panel 115 and includes a vertical door handle 1410. In some embodiments, vertical door handle 1410 extends vertically across a substantial portion of the vertical height of door panel 115 of the sliding door system 100'. For instance, to accommodate various user heights and/or for aesthetic purposes, vertical door handle 1410 can extend from at least a vertical midpoint of the door panel to a point proximate to top edge 230 of door panel 115 when vertical door handle 1410 is affixed to door panel 115.

Figure 15A:
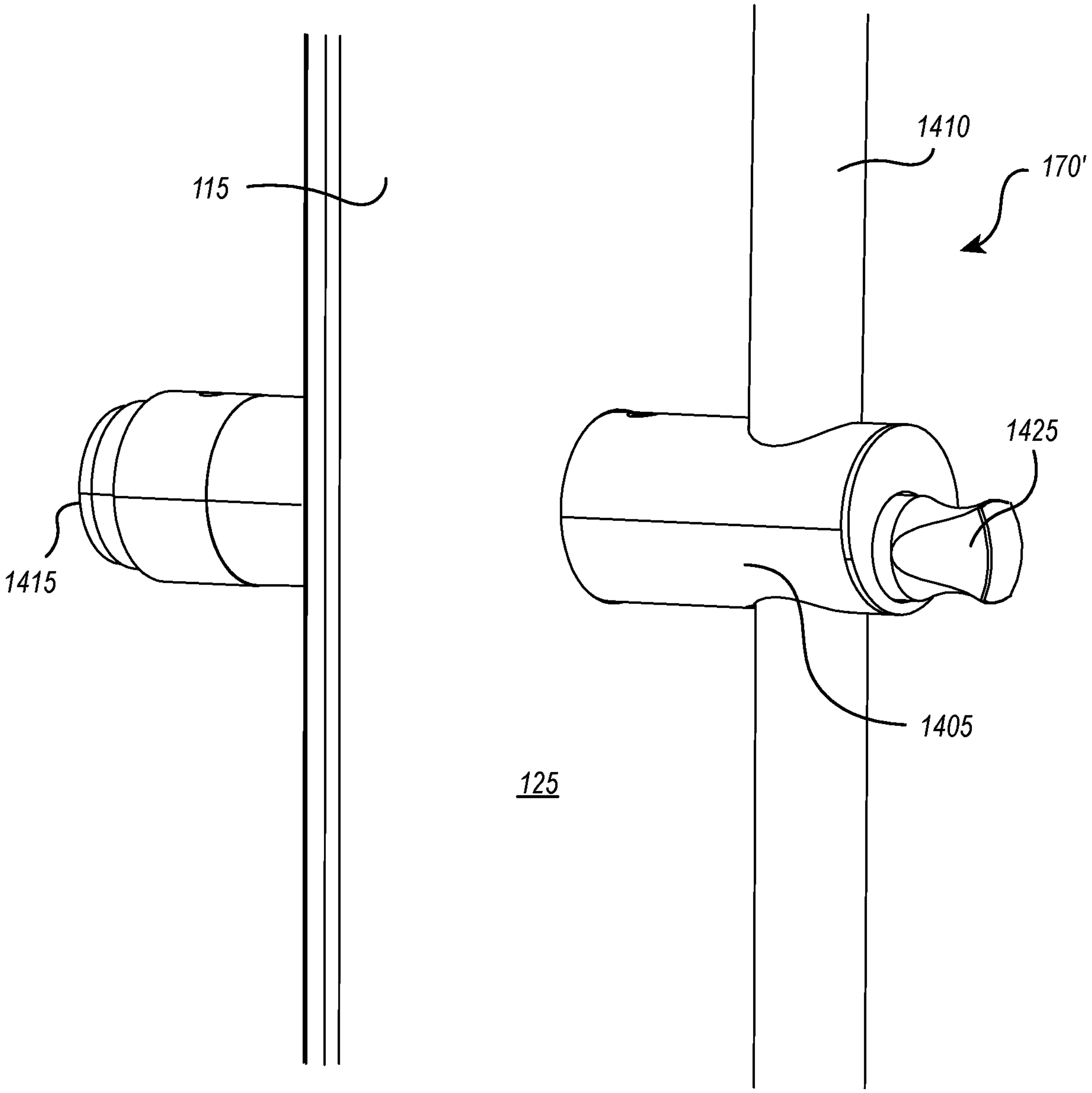
FIG. 15A illustrates a perspective view of various components of a locking handle assembly according to embodiments of the present disclosure.

FIG. 15A illustrates a perspective view of various components of a locking handle assembly 170' of a sliding door system 100'. Locking handle assembly 170' can include horizontal enclosure 1405 and vertical door handle 1410. FIG. 15A demonstrates that horizontal enclosure 1405 and vertical door handle 1410 can include a circular cross-section, but other configurations are within the scope of this disclosure.

Figure 15B:
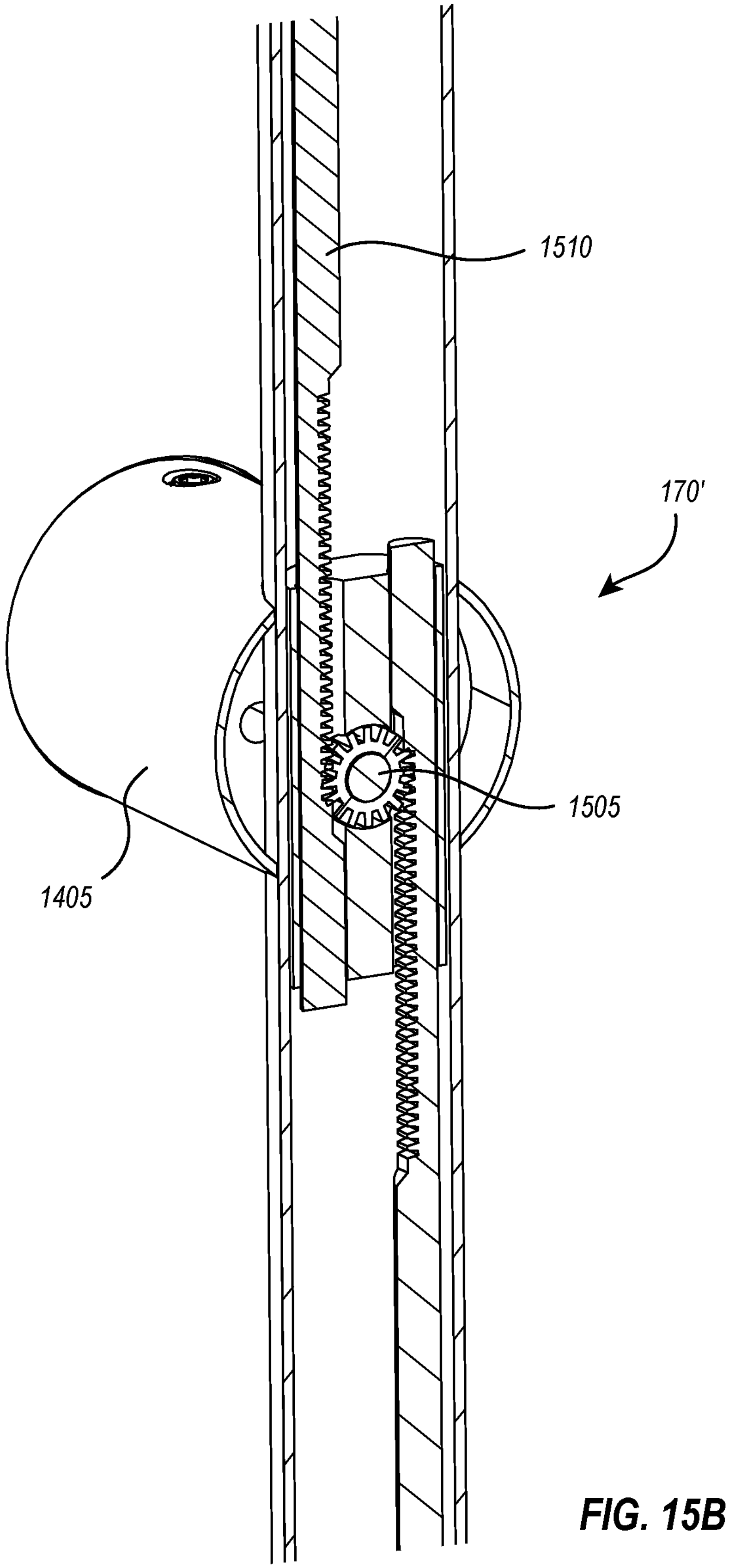
FIG. 15B illustrates a perspective cross-sectional view of a vertical door handle of a locking handle assembly according to embodiments of the present disclosure.

FIG. 15B illustrates a perspective cross-sectional view of vertical door handle 1410 of locking handle assembly 170'. FIG. 15B illustrates that horizontal enclosure 1405 may include a rotatable shaft 1505 operable to engage with and move one or more vertical shafts 1510 when either rotatable knob 1425 is rotated or a key is inserted within key cylinder 1415 to engage or disengage a locking pin 1605 (see FIG. 16) with locking pin receiver 1420.

Figure 16:
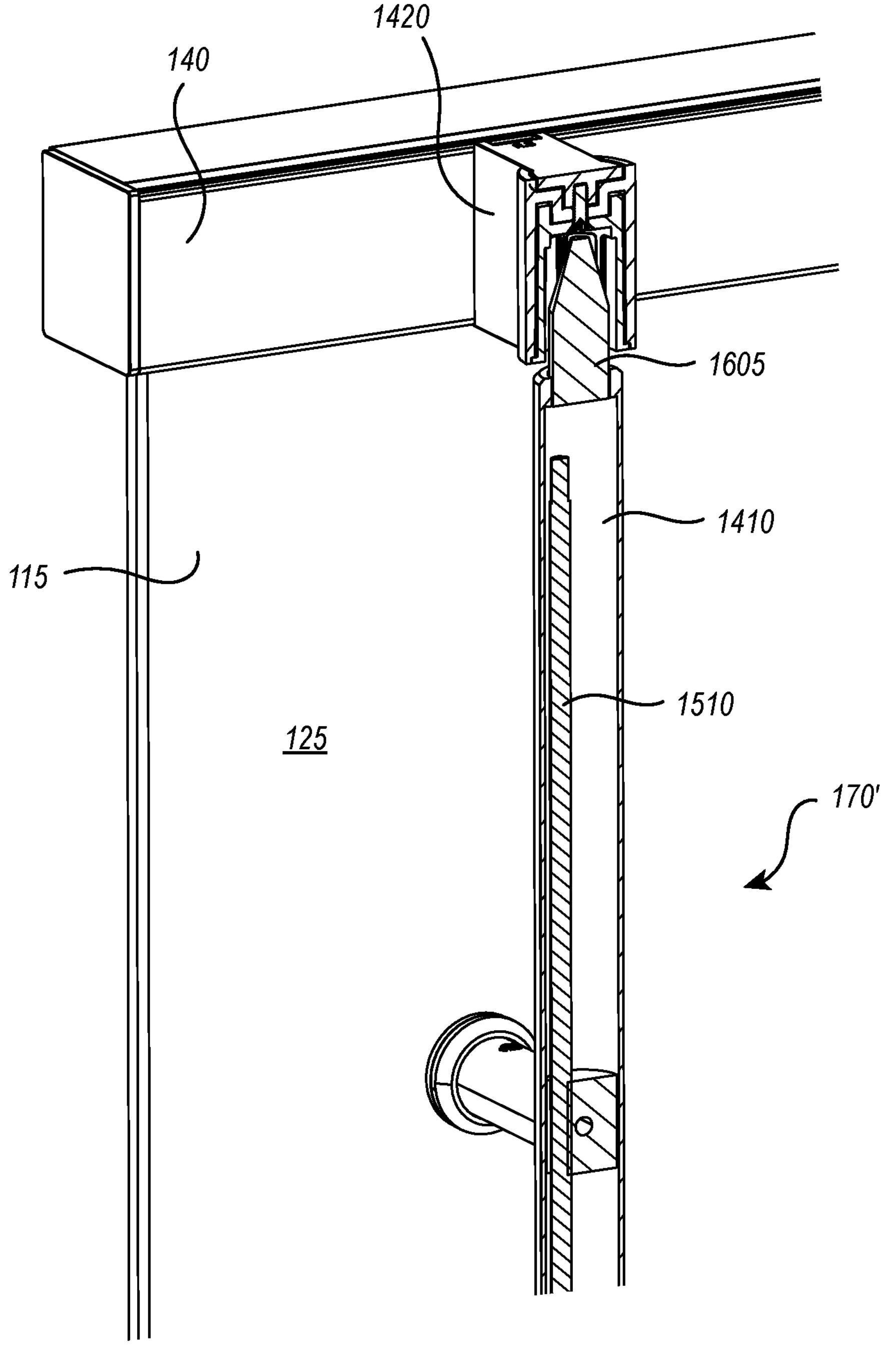
FIG. 16 illustrates a perspective cross-sectional view of a top portion of a locking handle and pin receiver assembly according to embodiments of the present disclosure.

FIG. 16 illustrates a perspective cross-sectional view of a top portion of a locking handle assembly 170' interfacing with a locking pin receiver 1420 of a track enclosure 140. Locking pin receiver 1420 can be affixed to an exterior wall of track enclosure 140 (e.g., an exterior wall of covering plate 1145), or any other portion of track enclosure 140 or other structure (e.g., a wall or ceiling of a building). FIG. 16 demonstrates that the vertical shaft 1510 can connect to a locking pin 1605 such that locking pin 1605 advances and retracts with vertical shaft 1510 as rotatable shaft 1505 is rotated (see FIG. 15B).

As illustrated, locking pin 1605 can be configured to reside within locking pin receiver 1420 when rotatable shaft 1505 is rotated into a locked position, thereby locking sliding door 110 in place and preventing the opening thereof. Locking pin 1605 can also be configured to retract from locking pin receiver 1420 of track enclosure 140 when rotatable shaft 1505 is rotated into an unlocked position, thereby allowing sliding door 110 to open and/or close freely.

Those skilled in the art will recognize, in view of the present disclosure, that the denotations of first, second, front, back, etc. (e.g., first face, second raised portion, first vertical wall, second bottom wall) in the present disclosure can be somewhat arbitrary and are provided for illustrative purposes and for ease of description. Thus, any ordinal denotations included herein are in no way limiting of the present disclosure. One will appreciate that any other denotations not explicitly included herein are within the scope of this disclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A sliding door, comprising:

a door panel comprising:

a first face;

a second face opposite the first face; and a top edge defining a first raised portion of the door panel, a second raised portion of the door panel, and an open space extending between the first raised portion and the second raised portion;

a plurality of rollers affixed to the door panel, wherein each of the plurality of rollers has an axis of rotation normal to the first face of the door panel; and a soft-close assembly secured within the open space between the first raised portion of the door panel and the second raised portion of the door panel, wherein the plurality of rollers and the soft-close assembly do not extend above the first raised portion or the second raised portion of the door panel.

2. The sliding door of claim 1, wherein the door panel comprises a glass panel.

3. The sliding door of claim 1, wherein:

at least one of the plurality of rollers is affixed to the door panel at least partially over the first raised portion of the door panel, and at least one of the plurality of rollers is affixed to the door panel at least partially over the second raised portion of the door panel.

4. The sliding door of claim 1, wherein the soft-close assembly is secured within the open space by affixation to both the first raised portion and the second raised portion of the door panel.

5. The sliding door of claim 1, wherein the plurality of rollers is disposed on the first face of the door panel and at least one catch of the soft-close assembly is oriented in a direction opposite the first face of the door panel.

6. The sliding door of claim 1, wherein:

the soft-close assembly comprises a first catch and a second catch, the first catch is configured to provide soft-close functionality in a first direction, and the second catch is configured to provide soft-close functionality in a second direction opposite the first direction.

7. The sliding door of claim 1, the sliding door further comprising:

a first mounting assembly mounted to the first raised portion of the door panel and second mounting assembly mounted to the second raised portion of the door panel, each of the first and second mounting assemblies comprising:

a first connection plate disposed on the first face of the door panel and a second connection plate disposed on the second face of the door panel, wherein at least one roller of the plurality of rollers is affixed of the first connection plate or the second connection plate.

8. The sliding door of claim 6, wherein the soft-close assembly is affixed at a first end to at least one connection plate of the first mounting assembly and is affixed at a second end to at least one connection plate of the second mounting assembly.

9. The sliding door of claim 6, wherein the second connection plate of each of the first and second connection assemblies comprises a leveling bracket configured to adjust a level of the door panel by adjustment of a relative position between the leveling bracket and the first connection plate.

10. A sliding door system, comprising:

a sliding door, comprising:

a door panel comprising:

a first face;

a second face opposite the first face; and a top edge defining a first raised portion of the door panel, a second raised portion of the door panel, and an open space extending between the first raised portion and the second raised portion;

a plurality of rollers affixed to the door panel, wherein each roller of the plurality of rollers has an axis of rotation normal to the first face of the door panel; and a soft-close assembly secured within the open space between the first raised portion of the door panel and the second raised portion of the door panel, the soft-close assembly comprising at least one catch; and a track enclosure, comprising:

a roller track positioned within the track enclosure, the plurality of rollers being movably disposed upon the roller track;

at least one soft-close actuator positioned within the track enclosure, a first soft-close actuator of the at least one soft-close actuator being configured to engage with a first catch of the at least one catch of the soft-close assembly to provide soft-close functionality in a first direction; and a roller stopper proximate to an end of the track enclosure, the roller stopper configured to prevent plurality of rollers from exiting the roller track, wherein the rollers had a concave lower profile and the roller stopper has a complementary convex profile.

11. The sliding door system of claim 10, wherein:

the roller track comprises an elongate track with a convex curvature, and each roller of the plurality of rollers comprises a corresponding concave curvature.

12. The sliding door system of claim 10, wherein the track enclosure further comprises:

an enclosure bracket comprising:

a top wall;

a first vertical wall configured to be disposed over at least a portion of the first face of the door panel when the plurality of rollers of the sliding door are arranged on the roller track within the track enclosure; and a first bottom wall that extends from the first vertical wall toward the first face of the door panel when the plurality of rollers of the sliding door are arranged on the roller track within the track enclosure; and a covering plate removable securable to the enclosure bracket, the covering plate comprising:

a second vertical wall configured to be disposed over at least a portion of the second face of the door panel when the plurality of rollers of the sliding door are arranged on the roller track within the track enclosure; and a second bottom wall extending from the second vertical wall toward the second face of the door panel when the plurality of rollers of the sliding door are arranged on the roller track within the track enclosure.

13. The sliding door system of claim 12, wherein the first bottom wall of the enclosure bracket comprises the roller track.

14. The sliding door system of claim 12, wherein the second vertical wall of the covering plate comprises the at least one soft-close actuator.

15. The sliding door system of claim 12, wherein:

the top wall of the enclosure bracket comprises a channel with a shelf extending from a bottom channel wall of the channel; and the covering plate comprises a protrusion configured for removable insertion into the channel and configured to rest on the shelf when the protrusion resides within the channel.

16. The sliding door system of claim 12, wherein the track enclosure includes first and second end caps configured to enclose over first and second opposing ends of the track enclosure, respectively, wherein:

the covering plate is in a locked configuration when the first and second end caps are secured over the first and second opposing ends of the track enclosure, respectively, and the covering plate is in a locked configuration when the first and second end caps are secured over the first and second opposing ends of the track enclosure, respectively, and the covering plate is in an unlocked configuration and therefore selectively removable from the track enclosure when the first and second end caps are removed from the first and second opposing ends of the track enclosure, respectively.

17. The sliding door system of claim 10 wherein the roller stopper rests on the roller track.

18. A mounting assembly for a door panel of a sliding door, the mounting assembly comprising:

a connection plate comprising:

one or more rollers configured to slidably support the sliding door; and a first horizontal flange protruding horizontally from the connection plate; and a leveling bracket securable to the door panel, the leveling bracket comprising:

a first vertical plate;

a second vertical plate disposed in a position parallel to the first vertical plate and separated by a distance corresponding to a width of the door panel;

at least one door panel support rod spanning the first and second vertical plates;

a second horizontal flange extending from the second vertical plate towards the first vertical plate;

a leveling bolt adjustably secured to the second horizontal flange and the first horizontal flange of the connection plate, such that a vertical position of the connection plates is adjustable relative to the leveling bracket; and a securement bolt configured to selectively secure the first vertical plate to the connection plate, such that the vertical position of the connection plate relative to the leveling bracket is fixed when the securement bolt is in a locket position.

19. The mounting assembly of claim 18, wherein the first vertical plate comprises one or more elongated holes configured to receive the one or more rollers such that the one or more rollers can be repositioned vertically within the one or more elongated holes as the vertical position of the connection plate is adjusted relative to the leveling bracket.

20. The mounting assembly of claim 18, wherein the first and second vertical plates of the leveling bracket comprise two separable components that are securable to one another by the at least one door panel support rod.

* * * * *